United States Patent
Gao et al.

(10) Patent No.: US 8,989,479 B2
(45) Date of Patent: Mar. 24, 2015

(54) REGION BASED VIRTUAL FOURIER FILTER

(75) Inventors: Lisheng Gao, Morgan Hill, CA (US);
Kenong Wu, Davis, CA (US); Allen Park, San Jose, CA (US); Ellis Chang, Saratoga, CA (US); Khurram Zafar, San Jose, CA (US); Junqing Huang, Fremont, CA (US); Ping Gu, Milpitas, CA (US); Christopher Maher, Campbell, CA (US); Grace H. Chen, Los Gato, CA (US); Songnian Rong, San Jose, CA (US); Liu-Ming Wu, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 381 days.

(21) Appl. No.: 13/381,696

(22) PCT Filed: Aug. 1, 2011

(86) PCT No.: PCT/US2011/046154
§ 371 (c)(1),
(2), (4) Date: Dec. 30, 2011

(87) PCT Pub. No.: WO2012/016243
PCT Pub. Date: Feb. 2, 2012

(65) Prior Publication Data
US 2012/0141013 A1 Jun. 7, 2012

Related U.S. Application Data

(60) Provisional application No. 61/369,649, filed on Jul. 30, 2010.

(51) Int. Cl.
*G06K 9/00* (2006.01)
*G06T 7/00* (2006.01)

(52) U.S. Cl.
CPC ....... *G06T 7/001* (2013.01); *G06T 2207/10061* (2013.01); *G06T 2207/20021* (2013.01); *G06T 2207/20056* (2013.01); *G06T 2207/30148* (2013.01)
USPC .......................................................... 382/149

(58) Field of Classification Search
CPC .......................................... G06T 2207/20056
See application file for complete search history.

(56) References Cited

U.S. PATENT DOCUMENTS 5,970,168 A * 10/1999 Montesanto et al. ......... 382/149
6,731,824 B2   5/2004 Russell (Continued)

*Primary Examiner* — Bhavesh Mehta
*Assistant Examiner* — Andrew Moyer
(74) *Attorney, Agent, or Firm* — Suiter Swantz pc llo

(57) ABSTRACT

The present invention includes searching imagery data in order to identify one or more patterned regions on a semiconductor wafer, generating one or more virtual Fourier filter (VFF) working areas, acquiring an initial set of imagery data from the VFF working areas, defining VFF training blocks within the identified patterned regions of the VFF working areas utilizing the initial set of imagery data, wherein each VFF training block is defined to encompass a portion of the identified patterned region displaying a selected repeating pattern, calculating an initial spectrum for each VFF training block utilizing the initial set of imagery data from the VFF training blocks, and generating a VFF for each training block by identifying frequencies of the initial spectrum having maxima in the frequency domain, wherein the VFF is configured to null the magnitude of the initial spectrum at the frequencies identified to display spectral maxima.

35 Claims, 13 Drawing Sheets

(56) References Cited

U.S. PATENT DOCUMENTS

2004/0202361 A1  10/2004  Evans et al.
2007/0081154 A1* 4/2007  Mapoles et al. .......... 356/237.5
2007/0247668 A1* 10/2007 Fuchs et al. .................. 358/3.03
2008/0075352 A1* 3/2008  Shibuya et al. ............... 382/141
2008/0219545 A1  9/2008  Chen et al.

* cited by examiner

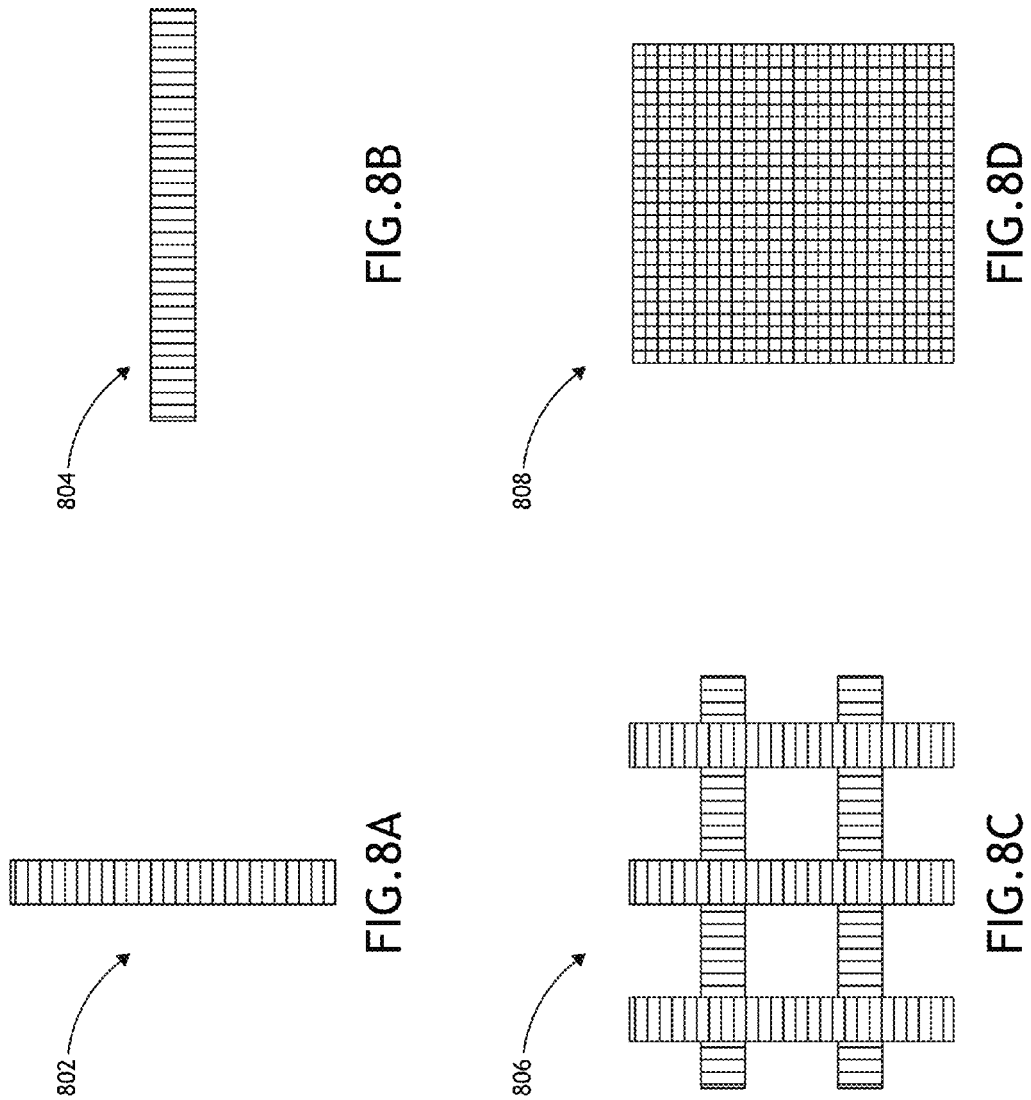

REGION BASED VIRTUAL FOURIER FILTER

TECHNICAL FIELD

The present invention generally relates to methods and systems for inspection based defect detection utilizing region based virtual Fourier filtering.

BACKGROUND

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etching, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on a specimen such as a reticle and a wafer. Inspection processes have always been an important part of fabricating semiconductor devices such as integrated circuits. However, as the dimensions of semiconductor devices decrease, inspection processes become even more important to the successful manufacture of acceptable semiconductor devices. For instance, as the dimensions of semiconductor devices decrease, detection of defects of decreasing size has become necessary since even relatively small defects may cause unwanted aberrations in the semiconductor devices.

Accordingly, much work in the inspection field has been devoted to designing inspection systems that can detect defects having sizes that were previously negligible. Typical inspection processes detect defects by comparing similar semiconductor device areas on a wafer. The differences detected between the two device areas can either be a defect, which can cause a device to function improperly, or a nuisance, which will not affect system operations. An integral phase of semiconductor wafer inspection involves optimizing the settings, commonly referred to as the "recipe," of an inspection device so that it can accurately distinguish defects from nuisances.

Inspection for many different types of defects has also become more important recently. For instance, in order to use inspection results to monitor and correct semiconductor fabrication processes, it is often necessary to know what types of defects are present on a wafer. In addition, since controlling every process involved in semiconductor manufacturing is desirable to attain the highest yield possible, it is desirable to have the capability to detect the different types of defects that may result from many different semiconductor processes. The different types of defects that are to be detected may vary dramatically in their characteristics. For example, defects that may be desirable to detect during a semiconductor manufacturing process may include thickness variations, particulate defects, scratches, pattern defects such as missing pattern features or incorrectly sized pattern features, and many others having such disparate characteristics.

Traditionally, hardware based Fourier filtering is utilized in order to filter repeating pattern areas of an imaged semiconductor wafer, allowing for the enhanced ability to detect semiconductor wafer defects. Hardware based Fourier filters, however, are not capable of selectively filtering out specified regions or patterns of a semiconductor wafer. As such, hardware based Fourier filters require a global filtering process, which leads to some regions of the semiconductor wafer to be 'over filtered.' In this sense, more frequency domain peaks are filtered out of given frequency domain spectra associated with a given patterned region than necessary, causing a signal from the associated region to be light 'starved.' I would, therefore, be advantageous to provide a method and system suitable for filtering illumination from patterned areas of a semiconductor wafer on a region-by-region basis.

SUMMARY

A computer implemented method for detecting defects in imagery data acquired from a semiconductor surface is disclosed. In one aspect, the method may include, but is not limited to, performing a pattern search of one or more sets of imagery data in order to identify one or more patterned regions on a semiconductor wafer; generating one or more virtual Fourier filter (VFF) working areas, wherein each VFF working area includes at least one of the one or more identified patterned regions; acquiring an initial set of imagery data from each of the VFF working areas; defining one or more VFF training blocks within each of the one or more identified patterned regions of the one or more VFF working areas utilizing the initial set of imagery data, wherein each VFF training block within an identified pattern region is defined to encompass a portion of the identified patterned region displaying a selected repeating pattern so as to limit an intensity contribution from non-repeating pattern portions of the identified patterned region; calculating an initial spectrum along at least one dimension for each VFF training block by transforming spatial domain intensity information associated with the one or more VFF training blocks to frequency domain spectral information utilizing the initial set of imagery data from each of the VFF training blocks; generating a VFF for each VFF training block by identifying frequencies of the initial spectrum having spectral maxima in the frequency domain, wherein the VFF is configured to null the magnitude of the initial spectrum at the frequencies of the initial spectrum identified to display spectral maxima; generating one or more filtered spectra for the one or more patterned regions by applying one or more generated VFFs to the initial spectrum of the one or more patterned regions; and creating a filtered set of imagery data for the one or more patterned regions by transforming the one or more generated filtered spectra of the one or more patterned regions to one or more spatial domain imagery data sets.

A computer implemented method for detecting defects in imagery data utilizing design data associated with a semiconductor surface is disclosed. In one aspect, the method may include, but is not limited to, performing a pattern search of design layout data associated with a semiconductor wafer in order to identify at least one of one or more patterned regions of a semiconductor wafer proximate to one or more device structures of the semiconductor wafer or the one or more device structures; generating one or more virtual Fourier filter (VFF) working areas for the semiconductor wafer, wherein each VFF working area includes at least one of the one or more patterned regions identified via the design layout data; acquiring an initial set of imagery data from each of the VFF working areas; defining one or more VFF training blocks within each of the one or more identified patterned regions of the one or more VFF working areas utilizing the initial set of imagery data, wherein each VFF training block within an identified pattern region is defined to encompass a portion of the identified patterned region displaying a selected repeating pattern so as to limit an intensity contribution from non-repeating pattern portions of the identified patterned region; calculating an initial spectrum along at least one dimension for each VFF training block by transforming spatial domain intensity information associated with the one or more training blocks to frequency domain spectral information utilizing the initial set of imagery data from each of the VFF training blocks; generating a VFF for each VFF training block by identifying frequencies of the initial spectrum having spectral maxima in the frequency domain; generating one or more filtered spectra for the one or more patterned regions by applying one or more generated VFFs to the initial spectrum of the one or more patterned regions; and creating a filtered set of imagery data for the one or more patterned regions by transforming the one or more generated filtered spectra of the one or more patterned regions to one or more spatial domain imagery data sets.

An alternative computer implemented method for detecting defects in imagery data acquired from a semiconductor surface is disclosed. In one aspect, the method may include, but is not limited to, generating one or more virtual Fourier filter (VFF) working areas for a semiconductor wafer, wherein each VFF working area includes one or more repeating patterns; performing a hardware Fourier filtering process on a portion of illumination reflected from a portion of the semiconductor wafer corresponding to the VFF working area; acquiring an initial set of imagery data from each of the VFF working areas, wherein the imagery data is acquired following the hardware Fourier filtering process; calculating an initial spectrum along at least one dimension for the one or more VFF working areas by transforming spatial domain intensity information associated with the one or more VFF working areas to frequency domain spectral information utilizing the initial set of imagery data from the one or more VFF working areas; generating a VFF for the one or more VFF working areas by identifying frequencies of the initial spectrum having spectral maxima in the frequency domain; generating a filtered spectrum for the one or more VFF working areas by applying the generated VFF of the one or more VFF working areas to the initial spectrum of the one or more VFF working areas, wherein the VFF is configured to null the magnitude of the initial spectrum at the frequencies of the initial spectrum identified to display spectral maxima; and creating a filtered set of imagery data for the one or more VFF working areas by transforming the generated filtered spectra of the one or more VFF working areas to spatial domain intensity information.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 8A illustrates a schematic view of a one-dimensional pattern for which a virtual Fourier filter may be configured to filter out, in accordance with one embodiment of the present invention.

FIG. 8B illustrates a schematic view of a one-dimensional pattern for which a virtual Fourier filter may be configured to filter out, in accordance with one embodiment of the present invention.

FIG. 8C illustrates a schematic view of a separable two-dimensional pattern for which a virtual Fourier filter may be configured to filter out, in accordance with one embodiment of the present invention.

FIG. 8D illustrates a schematic view of a non-separable two-dimensional pattern for which a virtual Fourier filter may be configured to filter out, in accordance with one embodiment of the present invention.

DETAILED DESCRIPTION OF THE INVENTION

Figure 1:
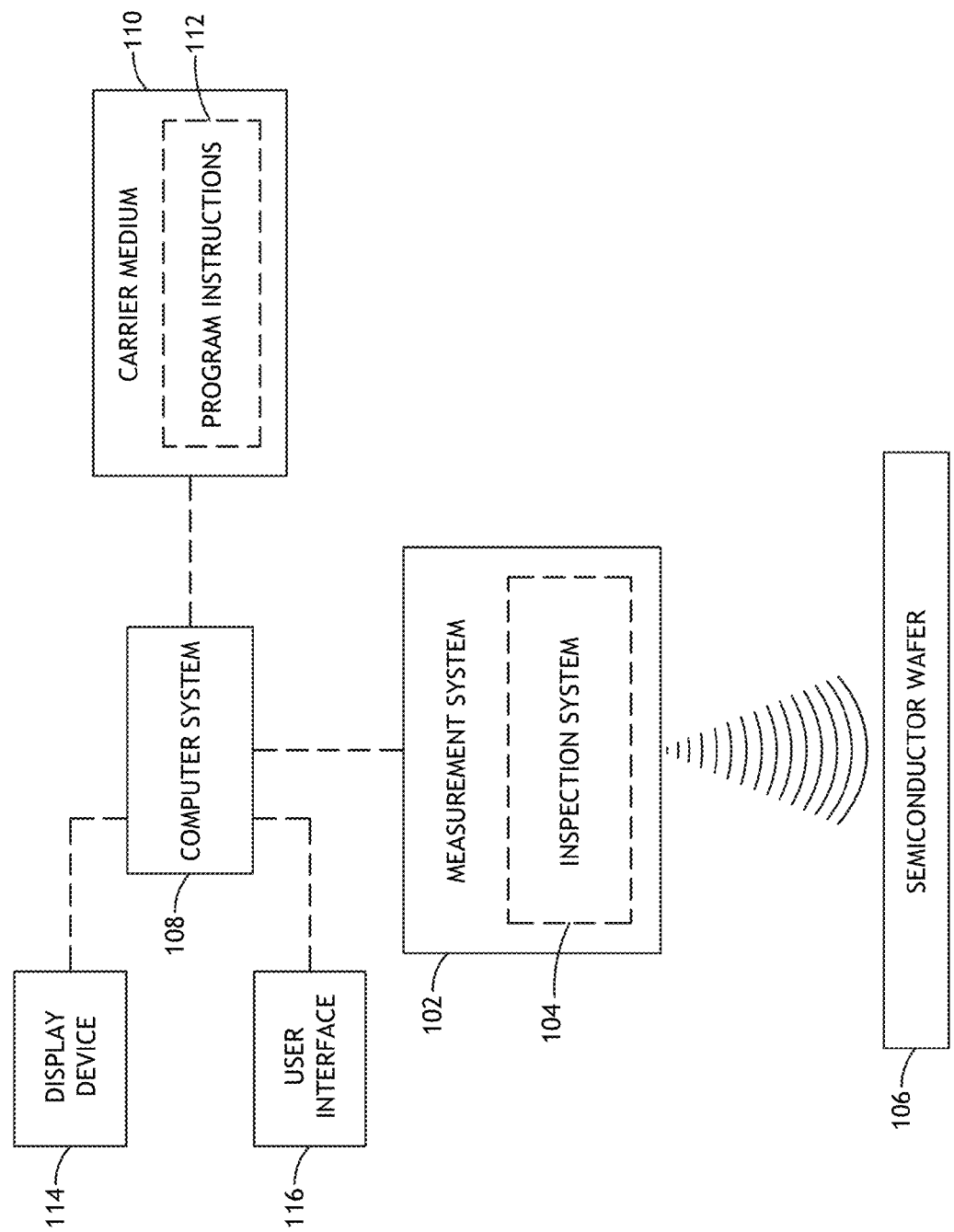
FIG. 1 is a block diagram illustrating a system for detecting defects in imagery data from a semiconductor surface, in accordance with one embodiment of the present invention.

Reference will now be made in detail to the subject matter disclosed, which is illustrated in the accompanying drawings.

Referring generally to FIGS. 1 through 13, a method and system for improved defect detection utilizing virtual Fourier filtering is described in accordance with the present disclosure. Employing a region-based virtual Fourier filter (VFF) may aid in optimizing overall semiconductor wafer defect detection sensitivity. The present invention is directed at providing a method and system suitable for training and implementing a region-based VFF, thereby improving the ability of an implementing inspection system to detect wafer defects.

As used throughout the present disclosure, the term "wafer" generally refers to a substrate formed of a semiconductor or non-semiconductor material. For example, a semiconductor or non-semiconductor material include may include, but are not limited to, monocrystalline silicon, gallium arsenide, and indium phosphide. A wafer may include one or more layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed.

One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

In other embodiments, an image of a reticle generated by a reticle inspection system is used as design data in the design data space. The reticle is used to print the design data on the wafer. In this manner an image beam image of the reticle is acquired by a high magnification optical reticle inspection system or an electron beam based reticle inspection system respectively. Alternatively the image of the reticle may be an aerial image of the reticle acquired by an aerial imaging reticle inspection system. The image of the reticle may be used as a proxy for the design data in any of the embodiments described herein that use design data to perform one or more steps.

A semiconductor chip design known as the "floorplan" contains the placement information for repeating structures known as cells. This information can be extracted from the physical design of a chip usually stored in GDSII or OASIS file formats.

The term "design data" as used in the present disclosure generally refers to the physical design of an integrated circuit and data derived from the physical design through complex simulation or simple geometric and Boolean operations. In addition, an image of a reticle acquired by a reticle inspection system and/or derivatives thereof may be used as a proxy or proxies for the design data. Such a reticle image or a derivative thereof may serve as a substitute for the design layout in any embodiments described herein that uses design data. Design data and design data proxies are described in U.S. patent application Ser. Nos. 11/561,735 and 11/561,659, both of which were filed on Nov. 20, 2006 and both of which are incorporated herein by reference.

FIG. 1 illustrates a system 100 suitable for improved defect detection utilizing virtual Fourier filtering, which may be utilized to perform the process 200. In one embodiment, the system 100 may include a measurement system 102 configured to detect defects on a semiconductor wafer 106, such as, but not limited to, an inspection system 104. The inspection system 104 may include any appropriate inspection system known in the art, such as, but not limited to, a bright-field inspection system, a dark-field inspection system, or an electron beam inspection system. Moreover, the illumination source of the inspection system 104 may include a narrow band illumination source or a broad band illumination source. In a further embodiment, the inspection system 104 may be configured to accept instructions from another subsystem of the system 100 in order to identify defects of the semiconductor wafer 106. For instance, the inspection system 104 may accept instructions from a computer system 108 of the system 100. Upon receiving the instructions from the computer system 108, the inspection system 104 may perform an inspection process at the locations of the semiconductor wafer 206 identified in the provided instructions.

In one embodiment, a computer system 108 of the system 100 may be configured to generate one or more region-based virtual Fourier filters utilizing imagery data associated with one or more VFF training blocks. In this sense, the computer system 108 may define one or more training blocks of one or more identified patterned regions. The computer system 108 may then utilize one or more of the defined training blocks to calculate an initial spectrum or spectra along at least one dimension of the one or more VFF training blocks by transforming the spatial domain imagery data to frequency domain data. Further, the computer system 108 may then generate a region-based VFF by identifying the spectral maxima (i.e., peak positions in the intensity versus frequency data) in the frequency domain data and nulling the magnitude of the initial spectrum at those peak frequencies. As such, the computer system 108 may generate a filtered spectrum for each training block by applying the generated VFF to the initial spectrum of each training block. Additionally, the computer system 108 may create a filtered set of imagery data for the one more patterned regions by applying the one or more generated VFFs to the one or more patterned regions and transforming the filtered frequency domain spectra of the one or more patterned regions to spatial domain intensity information.

Further, the computer system 108 may be configured to perform any other step(s) of any of the method embodiments described herein.

In another embodiment, the computer system 108 may be communicatively coupled to the inspection system 104 in any manner known in the art. For example, the computer system 108 may be coupled to a computer system of the inspection system 104. Moreover, the computer system 108 of the system 100 may be configured to receive and/or acquire data or information from other systems (e.g., inspection results from an inspection system or metrology results from a metrology system) by a transmission medium that may include wireline and/or wireless portions. In this manner, the transmission medium may serve as a data link between the computer system 108 and other subsystems of the system 100. Moreover, the computer system 108 may send data to external systems via a transmission medium. For instance, the computer system 108 may send a generated VFF to a separate inspection system, which exists independently of the described system 100.

The computer system 108 may include, but is not limited to, a personal computer system, mainframe computer system, workstation, image computer, parallel processor, or any other device known in the art. In general, the term "computer system" may be broadly defined to encompass any device having one or more processors, which execute instructions from a memory medium.

Program instructions 112 implementing methods such as those described herein may be transmitted over or stored on carrier medium 110. The carrier medium may be a transmission medium such as a wire, cable, or wireless transmission link. The carrier medium may also include a storage medium such as a read-only memory, a random access memory, a magnetic or optical disk, or a magnetic tape.

The embodiments of the system 100 illustrated in FIG. 1 may be further configured as described herein. In addition, the system 100 may be configured to perform any other step(s) of any of the method embodiment(s) described herein.

Figure 2:
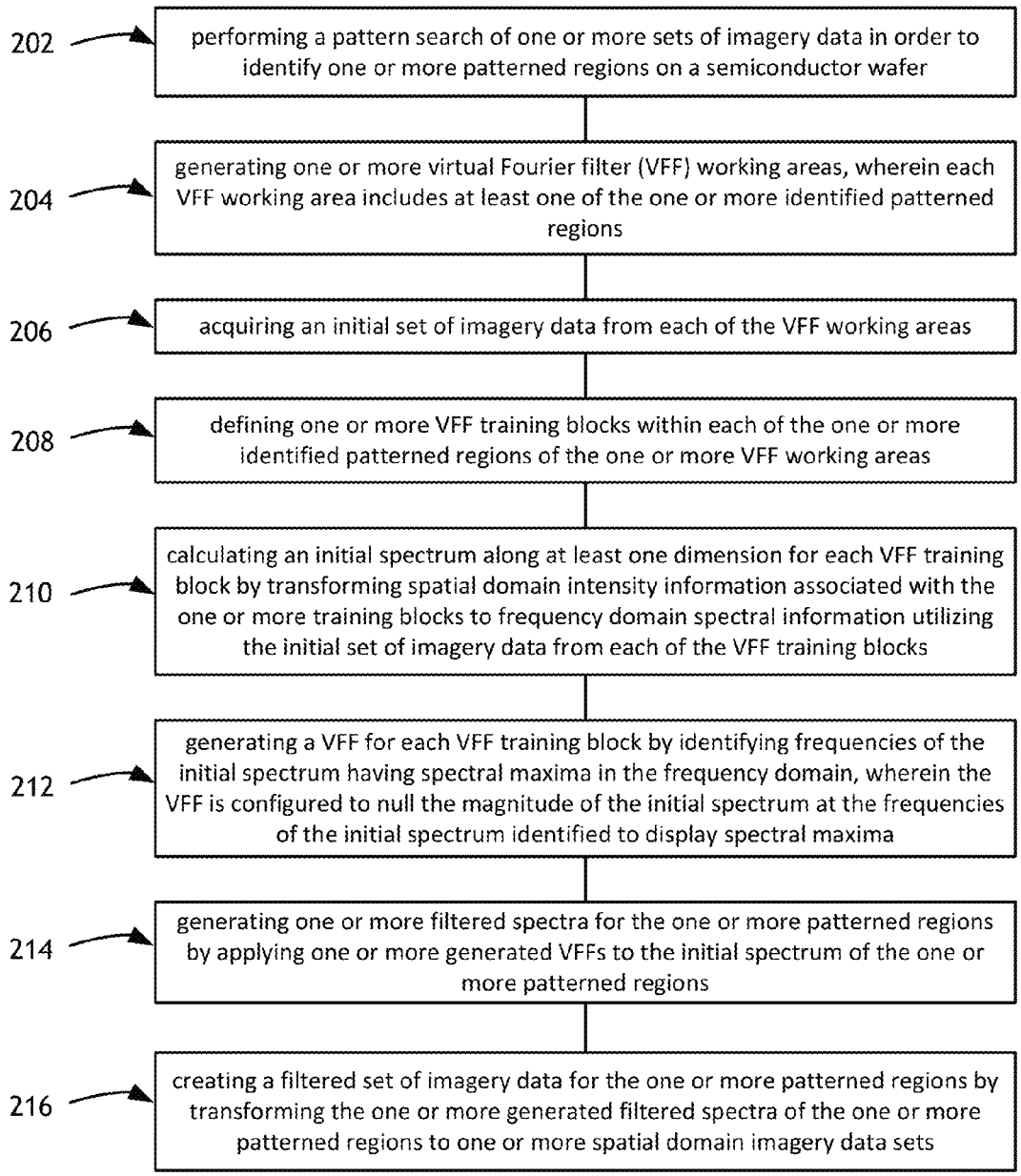
FIG. 2 is a flow diagram illustrating a method for detecting defects in imagery data from a semiconductor surface, in accordance with one embodiment of the present invention.

FIG. 2 is a flow diagram illustrating steps performed in a computer-implemented process 200 for detecting defects in imagery data acquired from a semiconductor surface.

In a first step 202, a pattern search may be performed in order to identify one or more patterned regions on a semiconductor wafer. In one aspect, imagery data of the surface of a semiconductor wafer 106 obtained via an inspection system 104 may be analyzed in order to identify one or more areas displaying a repeating pattern. For example, a pattern recognition algorithm may be applied to the imagery data in order to identify the one or more areas displaying a pattern. By way of another example, repeating pattern areas may be identified using feedback from a user via a user interface. In this manner, the system 100 may display an image collected via the inspection system 104 onto a display 114. The user may then identify and select one or more repeating pattern areas by inputting identification instructions via a user interface (e.g, keyboard, mouse, touchscreen, and the like). It is further contemplated that the repeating pattern areas may first be identified via one or more pattern recognition algorithms and then a user may 'check' the results of the automatic identification of the repeating pattern areas and make adjustments via the user interface. It should be recognized that a variety of pattern recognition algorithms may be implemented in the context of the present invention.

Figure 3:
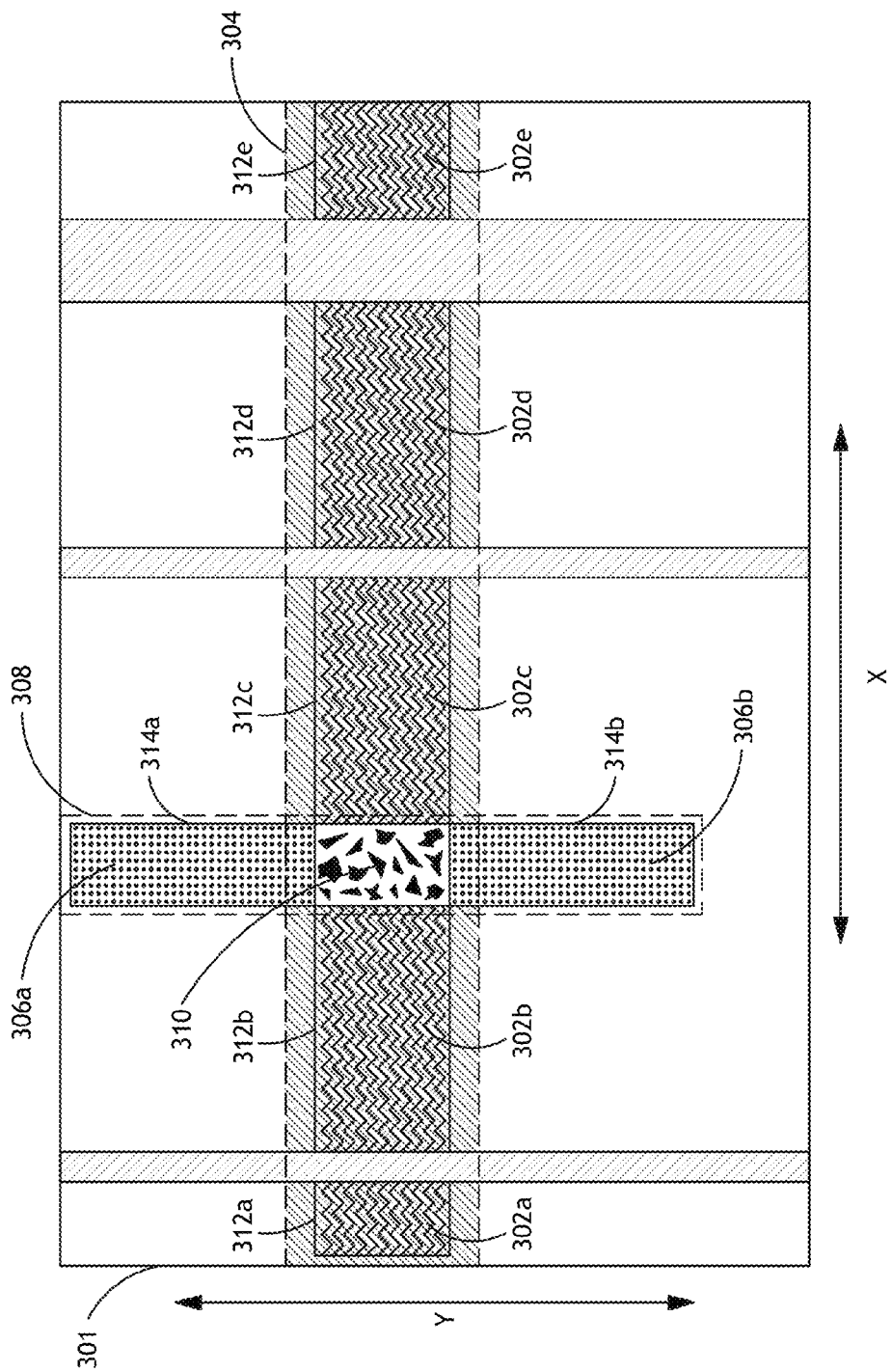
FIG. 3 is a schematic top plan view of a working area of an imaged semiconductor surface, in accordance with one embodiment of the present invention.

In another aspect, two or more patterned areas may be grouped together into a single patterned region. FIG. 3 illustrates multiple repeating pattern areas present on a semiconductor wafer 106 surface grouped together into a patterned region. For example, as shown in FIG. 3, a semiconductor wafer may include the repeating pattern areas 302a, 302b, 302c, 302d, and 302e, each of the regions displaying a substantially similar repeating pattern. These pattern areas may then be grouped together into a single pattern region 304. In another example, repeating pattern areas 306a and 306b may be grouped together to form the single pattern region 308.

In some embodiments, the pattern areas may be grouped into patterned regions based on the repeating pitches present in the pattern areas, the pattern complexity associated with the pattern areas, and the orientation of the pattern areas.

It is further recognized herein that a given pattern region (e.g., 304 or 308) may include non-patterned portions. For example, as illustrated in FIG. 3, the patterned region 304 and patterned region 308 may both include the non-patterned features 310.

In one embodiment, the repeating patterns may be grouped into a patterned region via a pattern searching and grouping algorithm. In this manner, a pattern searching and grouping algorithm executed by a processor of the computer system 108 of the system 100 may act to search for and group like patterned areas into a single patterned region. In one sense, the pattern searching and grouping algorithm may be configured to identify two or more repeating pattern areas of a portion of the semiconductor wafer 106 which display the same or nearly the same repeating pitch (e.g., size or orientation). In another sense, the pattern searching and grouping algorithm may then merge the identified two or more repeating pattern areas in a single patterned region.

In another embodiment, the system 100 may act to group like pattern areas into patterned regions utilizing user supplied feedback via the user interface 116. Moreover, it is also contemplated that the system 100 may be configured to display identified patterned regions to a user via a display 114 and the user may then provide feedback to the system 100 related to the accuracy of the automatic grouping process carried out via the pattern grouping algorithm. In this manner, the user may verify a pattern region, reject a pattern region, or adjust the location or size of a pattern region.

Figure 4:
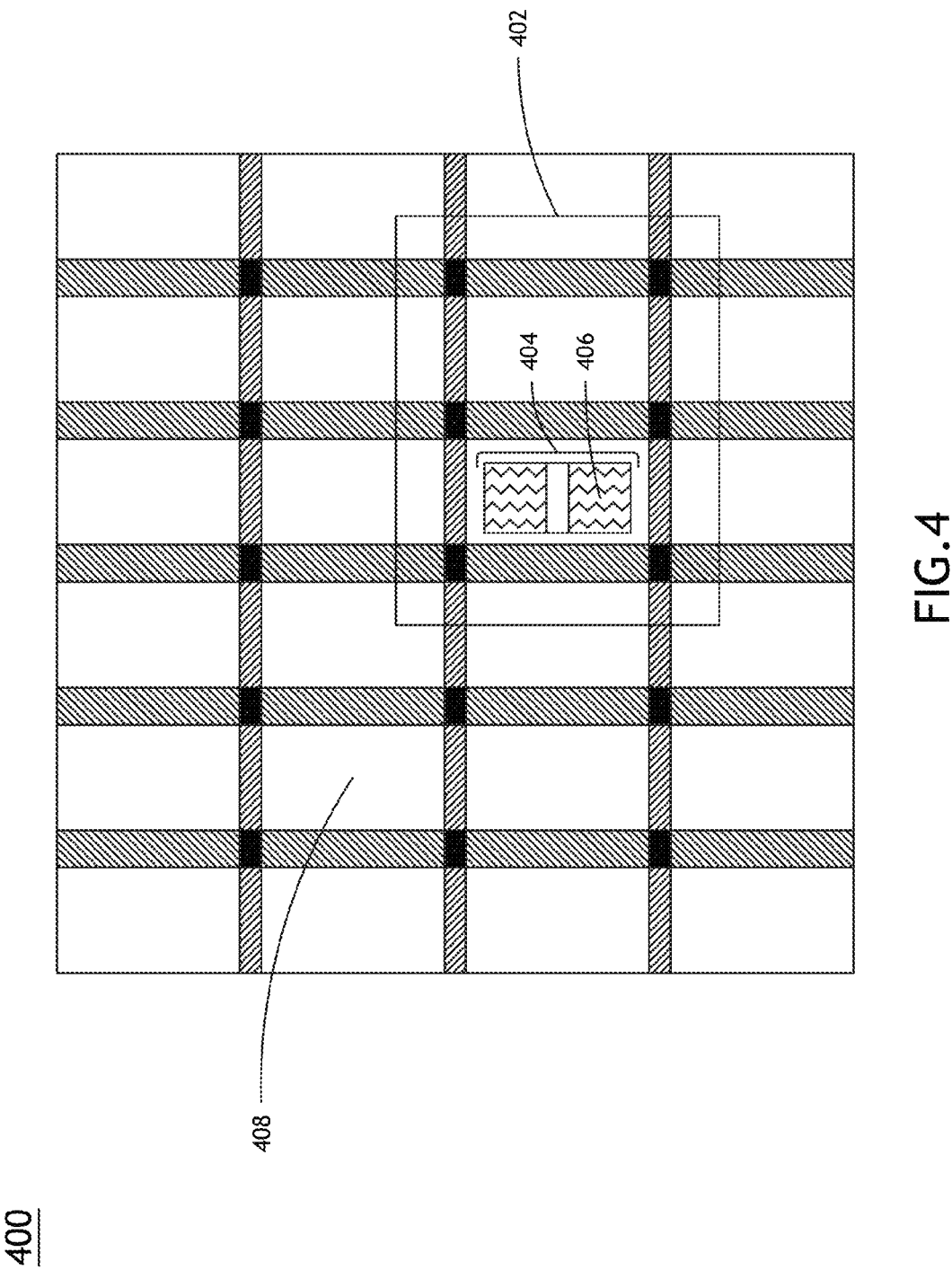
FIG. 4 is a schematic top plan view of a semiconductor surface, in accordance with one embodiment of the present invention.

In a second step 204, one or more virtual Fourier filter (VFF) working areas may be generated. In one aspect, each VFF working area includes at least one patterned region (e.g., 302a ... 302e) as defined in step 202. In a general sense, each VFF working area may include any number of identified patterned regions. FIG. 4 illustrates an embodiment of a single working area 402 designed to encompass a pattern region 404 of the wafer 408, wherein the patterned region 404 includes two separate pattern areas 406. The embodiment illustrated in FIG. 4 is not limiting, but rather should be merely interpreted as illustrative. It should be recognized that multiple working areas 402 may be implemented simultaneously, with each working area 402 including multiple patterned regions 404. Further, two different working areas may include the same patterned region. It should further be recognized that it is from the designated working area or areas 402 with which imagery data may be collected for generating the VFF of the present invention, as will be discussed in greater detail further herein.

In one embodiment, the VFF working area may encompass a die of the semiconductor wafer 106. For example, the set of imagery data acquired from the working area may include a set of images of a die. In this manner, each image may include of the set of images of the die may correspond with a portion of the imaged die.

In a further embodiment, the working areas 402 utilized to designate an area of the semiconductor wafer 106 with which to capture imagery data may be chosen by a user via the user interface 116. In this manner, a user may select a portion (i.e., working area 402) of the semiconductor wafer 106 in which to analyze.

In a third step 206, an initial set of imagery data may be acquired from each of the VFF working areas designated in step 204. In this manner, the system 100 may act to acquire imagery data (e.g., inspection based images) from the user defined area of the semiconductor wafer 106 as designated by a VFF working area.

Figure 5:
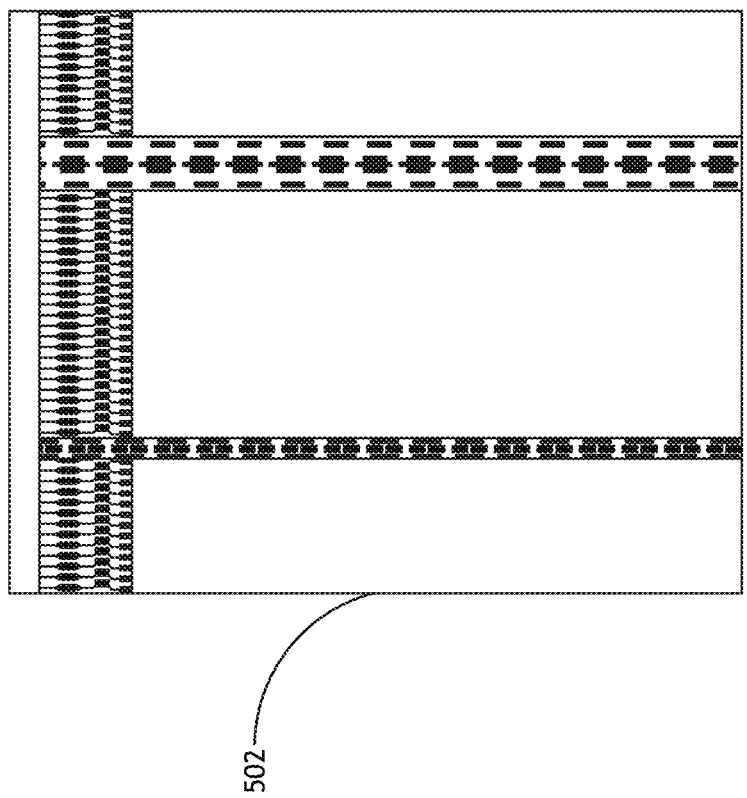
FIG. 5 is an imaged working area of a semiconductor surface, in accordance with one embodiment of the present invention.

FIG. 5 illustrates a rendering 500 of an image of a designated working area 502 of a surface of a semiconductor wafer 106 collected using an inspection tool 104. As shown in FIG. 5, the imaged working area displays two repeating pattern regions, one running horizontally and the other running vertically. This may be compared to the illustrated view of FIG. 3, wherein the working area 301 contains a horizontal repeating pattern region 304 and a vertical repeating pattern region 308. Applicant notes that imagery data of the one or more VFF working areas may be collected in any matter known in the art, such as, but not limited to, bright field and dark field inspection techniques.

In a further embodiment, two or more images acquired from the same working area may be combined digitally to form a single set of imagery data. It should be recognized that any image processing steps known in the art may be utilized to combine and/or process imagery data taken from one or more working areas.

In a fourth step 208, one or more VFF training blocks of each of the pattern regions of one or more of the VFF work areas may be defined. In one aspect, the system 100 may analyze the acquired imagery data of step 206 in order define one or more VFF training blocks within each of the patterned regions of a working area. For example, as shown in FIG. 3, the system 100 may act to define the VFF training blocks 312a, 312b, 312c, 312d, and 312d of the patterned region 304. Similarly, the system 100 may act to define the VFF training blocks 314a and 314b of the patterned region 308. The VFF training blocks of a patterned region are utilized in order to limit the contribution of light reflected from non-patterned areas of the surface of the semiconductor 106. In this manner, the VFF training blocks are configured to encompass substantially only a selected repeating pattern found in a given patterned region. For example, with respect to pattern region 304, as shown in FIG. 3, the VFF training blocks 312a, 312b, 312c, 312d, and 312e may encompass the repeating pattern areas of 302a, 302b, 302c, 302d, and 302e respectively. Similarly, with respect to pattern region 308, the VFF training blocks 304a and 304b may encompass the repeating pattern areas of 306a and 306b respectively. It should be noted that the above description relating to the number of VFF training blocks is not limiting and should be interpreted merely as illustrative. In a general sense, it should be recognized that a given pattern region may include any number of VFF training blocks.

In one embodiment, the system 100 may implement a VFF training block algorithm in order to automatically define the one or more training blocks of one or more patterned regions of a VFF working area. For example, a VFF training block algorithm may locate one or more portions of a page break containing only a repeating pattern.

In another embodiment, the training blocks of one or more patterned regions may be defined using feedback from a user via a user interface 116 of the system 100. In this manner, the system 100 may display the imagery data collected for a given working area onto a display device 114. The user may then locate and define the size of one or more VFF training blocks of a given patterned region via the user interface 116 (e.g., keyboard, mouse, touchscreen, and the like).

In a fifth step 210, an initial spectrum for one or more of the VFF training blocks defined in step 208 may be calculated. In one aspect, an initial spectrum for one or more of the training blocks may be calculated by transforming the spatial domain intensity information (gathered with the inspection tool 104 of the system 100) to frequency domain spectral information. The transformation of spatial domain information to frequency domain information may involve the application of any known 'Fourier-like' transformation known in the art. Such transformations may include, but are not limited to, a Fourier transformation, a Hartley transformation, or any suitable canonical transformation known in the art.

Figure 6:
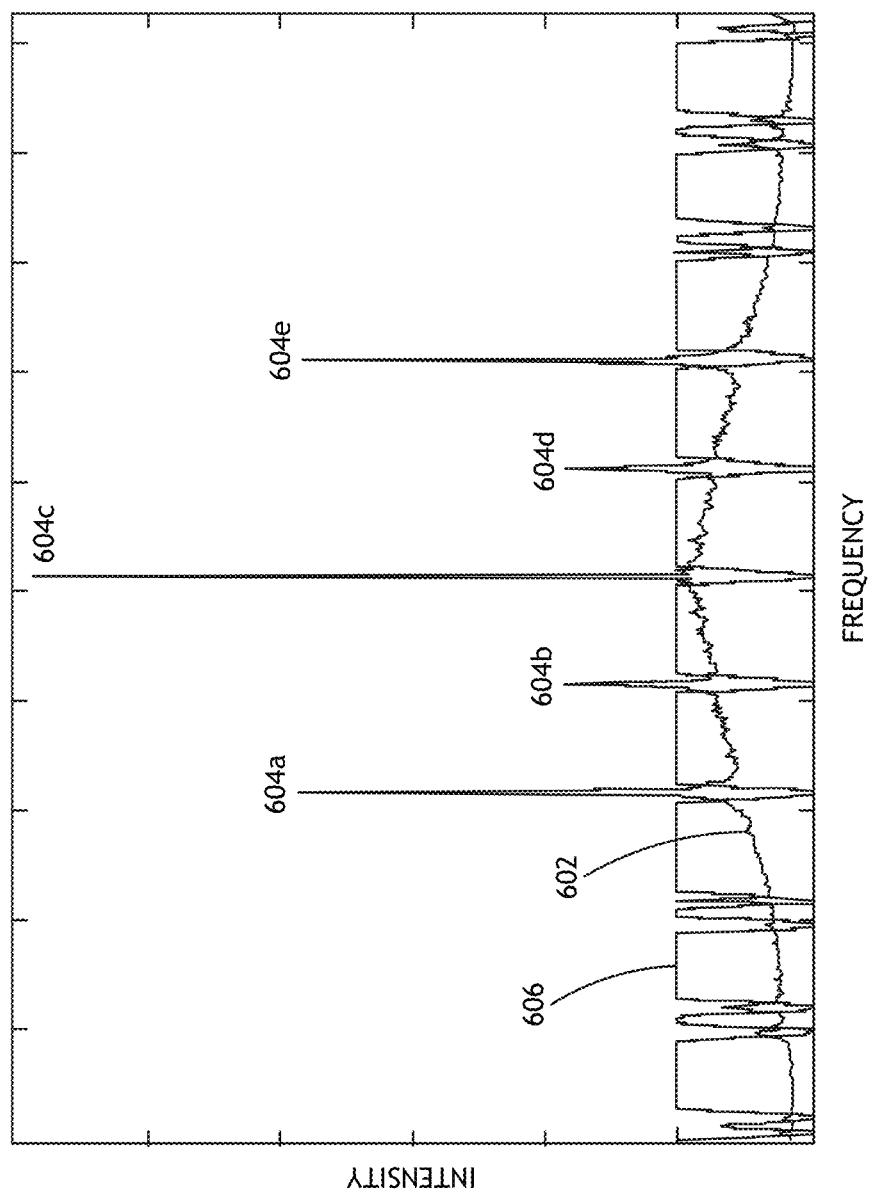
FIG. 6 illustrates an initial frequency domain spectrum, in accordance with one embodiment of the present invention.

FIG. 6 illustrates frequency domain spectrum 602 calculated by transforming spatial domain intensity information from imagery data acquired from one or more VFF training blocks displaying periodicity along one direction (e.g., X-direction or Y-direction). It should be recognized that the spectral information depicted in FIG. 6 displays light intensity as a function of frequency.

The spatial domain-frequency domain transformation may include transforming spatial intensity information along at least one spatial direction to frequency-domain spectral information. In this regard, it is recognized that a two-dimensional image acquired from a given VFF training block, displaying intensity as a function of aerial position, may be transformed to a frequency-domain spectrum. Further, it is recognized that a two-dimensional image displaying periodicity along a single direction (e.g., X-direction or Y-direction) may be mapped to a one-dimensional frequency domain spectrum. It is further recognized, however, that for two-dimensional images displaying non-separable two-dimensional periodicity (e.g., periodic array) it is possible to transform the two-dimensional spatial domain image to a two-dimensional frequency domain spectral map. It should be recognized by those skilled in the art that there exist a variety of spatial domain-frequency domain transformation operations suitable for implementation in the present invention. Methods for performing spatial domain to frequency domain transformations in the context of semiconductor inspection data are described in U.S. Pat. No. 5,537,669, issued on Jul. 16, 1996, U.S. Pat. No. 6,021,214, issued on Feb. 1, 2000, U.S. Pat. No. 6,665,432, issued on Dec. 16, 2003, and U.S. Pat. No. 7,218,768, issued on May 15, 2007, all of which are herein incorporated in their entirety by reference.

In a further embodiment, spatial imagery data taken from two or more VFF training blocks may be combined digitally prior to the application of the above described spatial domain-frequency domain transformation. In this regard, it is noted that the system 100 or user may select two or more of the available VFF training blocks (e.g., 312a ... 312e) of a given patterned region (e.g., 304) in order to improve the sampling statistics of a given set of spatial imagery data. For example, referring again to FIG. 3, the system 100 (via algorithmic selection or user feedback) may select a first VFF training block 312b and a second VFF training block 312d and combine them to form an aggregated set of spatial imagery data. It is recognized that in so doing the system 100 algorithm (or user feedback) may identify peaks in intensity versus spatial position data of the training block 312b and 312d and align the periodic patterns associated with the two training blocks 312b a and 312d prior to digitally adding the two data sets together. Upon creation of an aggregated set of spatial imagery data, the above described spatial domain-frequency domain transformation may be applied.

In a sixth step 212, a virtual Fourier filter (VFF) may be generated for one or more of the VFF training blocks defined in step 208. In a seventh step 214, a filtered spectrum for one or more VFF training blocks may be generated by applying the generated VFF of step 212 to the initial spectra of one or more VFF training blocks.

Referring again to FIG. 6, in one aspect, a VFF 606 may be generated for one or more of the VFF training blocks utilizing the identified frequencies of the initial spectrum 602 (calculated in step 210) which display maxima (e.g., 604a, 604b, 604c, or the like) in the frequency domain.

In another aspect, the VFF 606 is configured to null the magnitude of the intensity of the initial spectrum at the frequencies identified as displaying a spectral maximum. In this manner, a generated VFF 606 may act to limit the intensity contribution associated with the periodic pattern, manifested by the intensity peaks in the frequency domain data. By nulling the intensity peaks of the frequency domain intensity data, the system 100 may act to remove or at least limit the contribution from the repeating pattern portions of an inspected semiconductor wafer 104, as will be discussed in greater detail further herein. As depicted in FIG. 6, the VFF 606 is defined to have zero amplitude at the frequency locations of the peak maxima (e.g., 604a, 604b, 605c, and the like) of the initial frequency domain spectrum 602.

In one embodiment, the system 100 may automatically locate the position (i.e., frequency value) of the intensity maxima via a peak finding algorithm. For example, the peaking finding algorithm of system 100 may act to find all or nearly all of the intensity peaks (e.g., 604a, 604b, 604c, or the like) of an initial spectrum (e.g., 602). It should be recognized that a number of peak finding algorithms may be suitable for implementation in the present invention.

In another embodiment, intensity peaks of a set of intensity versus frequency data may be identified utilizing feedback provided by a user via a user interface. In this manner, the system 100 may display one or more images of the frequency domain intensity spectra onto a display device 114. The user may then identify one or more of the intensity peaks by inputting identification instructions via the user interface 116 (e.g., keyboard, mouse, touchscreen, or the like). In a further embodiment, the intensity peaks of a given frequency domain spectrum may first be identified via one or more peaking finding algorithms. Then, a user may 'check' the results of the automatic peak identification and make adjustments to the set of identified peaks via the user interface 116.

In a further embodiment, the system 100 may be configured to allow a user to modify the criterion used by the peaking finding algorithm of the system 100. For example, the system 100 may be configured to allow the user to select the frequency range with which the system 100 should analyze. In another example, the system 100 may be configured to allow the user to establish a minimum intensity with which a peak intensity position should be assigned, thereby disregarding all peaks below the selected minimum intensity. It should be recognized by those skilled in the art that the above examples related to peaking finding criterion do not represent limitations but should merely be interpreted as illustrative as there exist a number of criterion know in the art that may be selected and/or adjusted by a user.

Upon identification of the peak locations (e.g., 604a, 604b, 604c, or the like), the system 100 may form the VFF 606 by creating a function having zero amplitude at the frequency locations of the identified peaks and a maximum amplitude of unity, as depicted in FIG. 6. As such the VFF 606 function acts to null the intensity peaks of the initial frequency domain spectrum, while maintaining the same amplitude value at non-peak frequencies.

Figure 7:
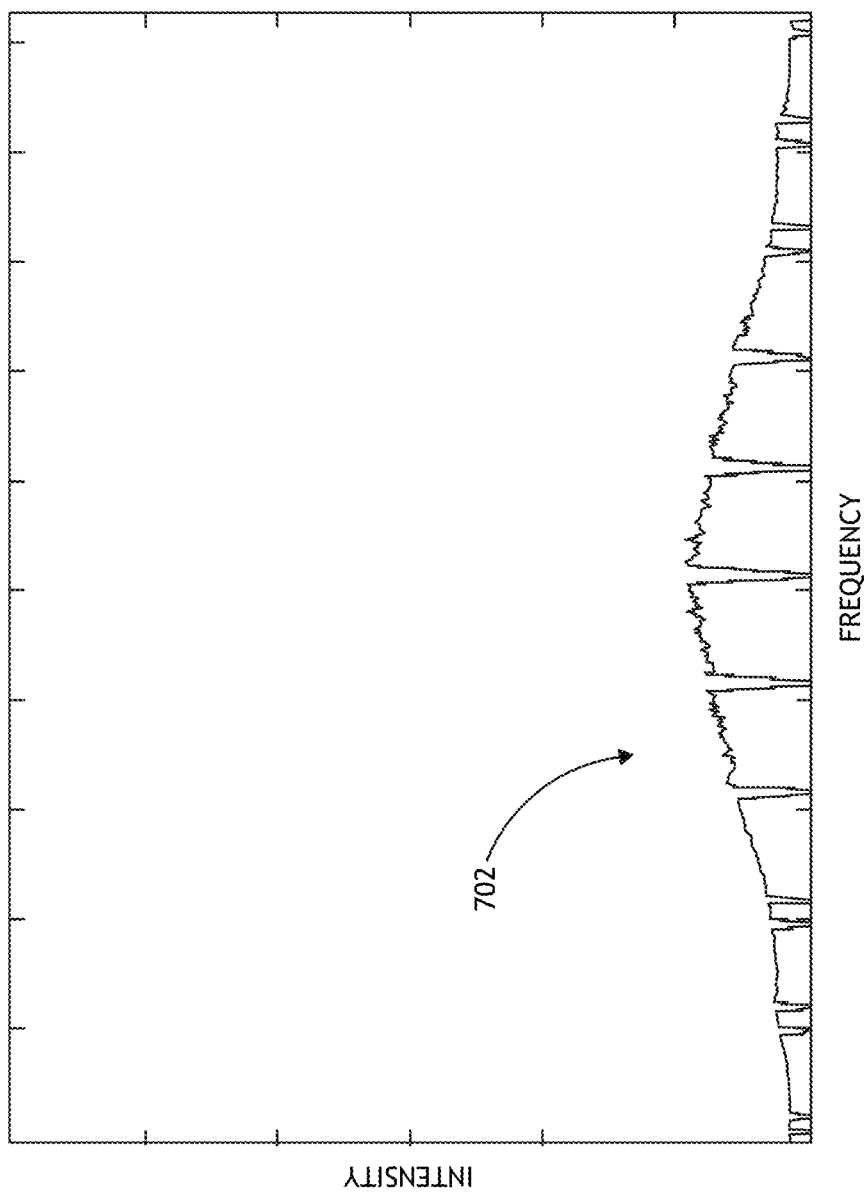
FIG. 7 illustrates a filtered frequency domain spectrum, in accordance with one embodiment of the present invention.

FIG. 7 illustrates a filtered spectrum 702 resulting from the application of the generated VFF 606 to the initial spectrum 602 of one or more training blocks. As shown in FIG. 7, the peaks (e.g., 604a, 604b, 604c, and the like) present in the unfiltered spectrum 602 of FIG. 6 have been filtered out, while the intensity levels of the non-peak frequencies of the spectrum 702 remain unchanged with respect to the initial spectrum 602.

In another embodiment, two or more VFFs may be merged to form a single aggregated VFF. For example, a first VFF taken from a first VFF training block of a pattern region may be merged with a second VFF taken from a second training of the same pattern region. For instance, the spectra taken from the first and second training blocks may be averaged together. In another instance, the two spectra may be combined selectively, wherein the system 100 may actively choose which portions of the two spectra to combine. In a further embodiment, the merging of two or more VFFs may occur on an automated basis utilizing a merging algorithm of the system 100. In another embodiment, the system 100 may act to merge two or more VFFS based on user provided feedback via the user interface 116. For example, upon viewing two or more filtered spectra 702 or the associated VFFs 606 on a display device 114, the user may provide user feedback as to how to merge the two or more sets of data. For instance, the user may select a group of VFFs 606 with which to merge. In a further embodiment, the user, via user interface 116, may select two or more VFF training blocks of a pattern region with which to combine. The system 100 may then automatically perform a merging operation, thereby merging the VFFs associated with the VFF training blocks selected by the user.

It is further recognized herein that the merging of two or more VFFs may be carried out by first merging two or more frequency domain data sets prior to identification of peak locations. In this sense, the system 100 may identify the peak locations of an aggregated intensity versus frequency data set consisting of a combination of intensity versus frequency data sets acquired from two or more VFF training blocks.

In another embodiment, the initial set of imagery data may include a first set of imagery data collected on a first channel of an inspection system and a second set of imagery data collected on a second channel of the inspection. In this regard, each filter may be configured to correspond with an individual channel of the inspection system.

Referring now to FIGS. 8A through 8D, the VFF filter may be configured as a one-dimensional filter or a two-dimensional filter. In one embodiment, as shown in FIG. 8A and 8B, a one-dimensional VFF may consist of a filter suitable for filtering out illumination contributions from patterned regions have only a vertical or horizontal periodicity. For instance, region 802 of FIG. 8A illustrates a region having a vertically repeating structure, while region 804 of FIG. 8B illustrates a region having a horizontally repeating structure. In this regard, the VFF generated in step 212 may be configured to filter out illumination from a one-dimensional pattern, as shown in FIGS. 8A and 8B.

In another embodiment, the VFF may include a two-dimensional VFF. For example, FIG. 8C, illustrates a patterned region having a 'separable' two-dimensional structure. In this sense, the component structures of structure 806 each display periodicity along either the vertical or horizontal direction. As such, the VFF generated in step 212 may be configured to filter out illumination from a 'separable' two-dimensional patter, as shown in FIG. 8C.

By way of another example, FIG. 8D, illustrates a patterned region having a 'non-separable' two dimensional structure. In this sense, the periodicity displayed in structure 808 cannot be separated into two separate orthogonal directions. As such, a generalized two-dimensional filter is required. It is noted that methods for two-dimensional spectral analysis in the context of semiconductor inspection data are described in U.S. Pat. No. 5,537,669, issued on Jul. 16, 1996, U.S. Pat. No. 6,021,214, issued on Feb. 1, 2000, U.S. Pat. No. 6,665,432, issued on Dec. 16, 2003, and U.S. Pat. No. 7,218,768, issued on May 15, 2007, all of which are incorporated in their entirety by reference above.

In an eighth step 216, a filtered set of imagery data for the one or more patterned regions may be generated utilizing the one of more VFFs generated in step 212. In one aspect, a VFF filter generated using a selected VFF training block may be used to filter frequency domain spectral information gathered from one or more patterned regions. In this manner, a first VFF training block (or a sub-set of available training blocks) may be utilized to train the VFF (as described in step 212). After generating the VFF, the VFF may be applied to the spectral data sets collected from additional VFF training blocks of the given patterned region. As such, the VFF may be used to filter out the spectral intensity peaks identified during VFF training using the sub-set of VFF training blocks from other portions of the selected patterned region. This process results in a set of filtered frequency domain data associated for the entire patterned region.

In a further aspect, a filtered imagery data set associated with one or more pattern regions may be creating by performing a frequency domain-to-spatial domain transformation on the filtered frequency domain data associated with the one or more patterned regions. Those skilled in the art will recognize that the filtered frequency domain data may be transformed to spatial domain data utilizing a variety of transformation techniques. Methods for performing frequency domain-to-spatial domain transformations in the context of semiconductor inspection data are described in U.S. Pat. No. 5,537,669, issued on Jul. 16, 1996, U.S. Pat. No. 6,021,214, issued on Feb. 1, 2000, U.S. Pat. No. 6,665,432, issued on Dec. 16, 2003, and U.S. Pat. No. 7,218,768, issued on May 15, 2007, all of which are incorporated in their entirety above.

Figure 9A:
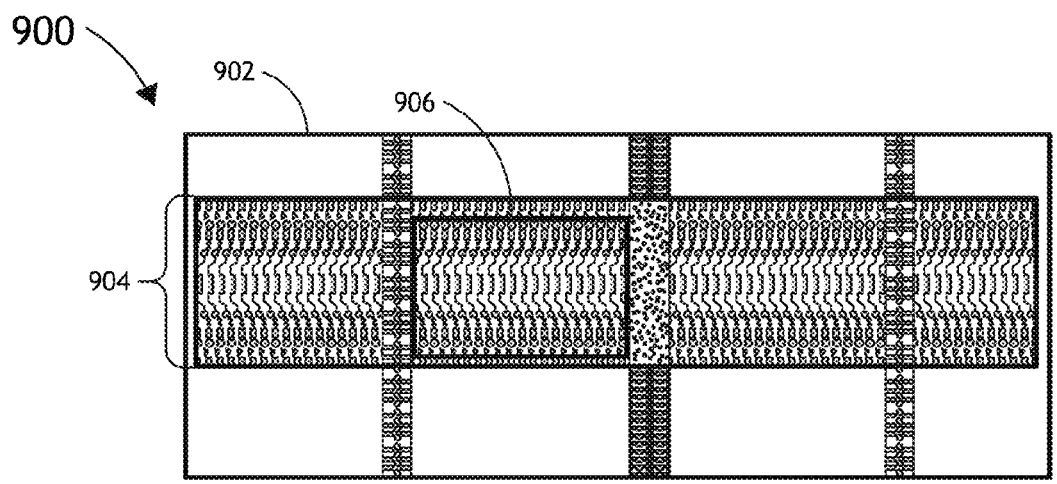
FIG. 9A illustrates an image of a VFF training block of a patterned region measured within a working area prior to filtering, in accordance with one embodiment of the present invention.
Figure 9B:
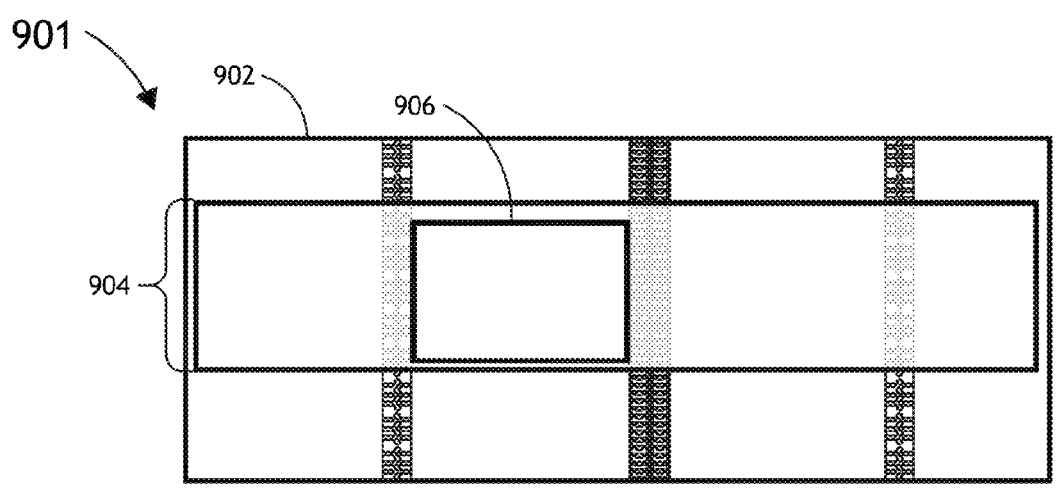
FIG. 9B illustrates an image of a VFF training block of a patterned region measured within a working area after filtering, in accordance with one embodiment of the present invention.

Referring now to FIGS. 9A and 9B, an illustration of imagery data acquired before and after application of a VFF trained via the process 200 described above is depicted. FIG. 9A illustrates an illustration of imagery data 900 taken from a working area 902 acquired with an inspection tool 104. The working area 902 includes a patterned region 904 having four areas displaying a substantially similar repeating pattern. The VFF training block 906 is designated for the purposes of generating a training block specific VFF. Upon generation of a VFF based on the imagery data and spatial domain-frequency domain transformation as outlined above, the VFF created using training block 906 may be applied to all repeating pattern areas within the patterned region 904. FIG. 9B illustrates a rendering of imagery data 901 taken from the working area 902 following application of the trained VFF. As illustrated, the application of the VFF acts to remove the pattern portions of the patterned region 904 which are identical to the repeating pattern of the training block 906, used to train the applied VFF. It should be recognized that the above description related to the imagery data of FIGS. 9A and 9B is not limiting and should merely be interpreted as illustrative.

In a further step of process 200, the spectral results of step 214 may be verified by comparing the filtered spectra of step 214 to the initial calculated spectra of step 210. In one aspect, the filtered spectrum for each training block may be compared to the initial calculated spectrum derived from the initial spatial domain imagery data. For example, as shown in FIG. 6 and FIG. 7, the filtered spectrum 702 acquired from a training block may be compared to the initial spectrum 602 calculated from imagery data acquired from the given training block. In a further step of process 200, the imagery results of step 216 may be verified by comparing the filtered imagery results of step 216 to the initial set of imagery results of step 206. Further, the system 100 may simultaneously display the initial imagery data (or initial frequency domain data) and the filtered imagery data (or the filter frequency domain data) onto display device 114, allowing the user to compare the results.

Figure 10:
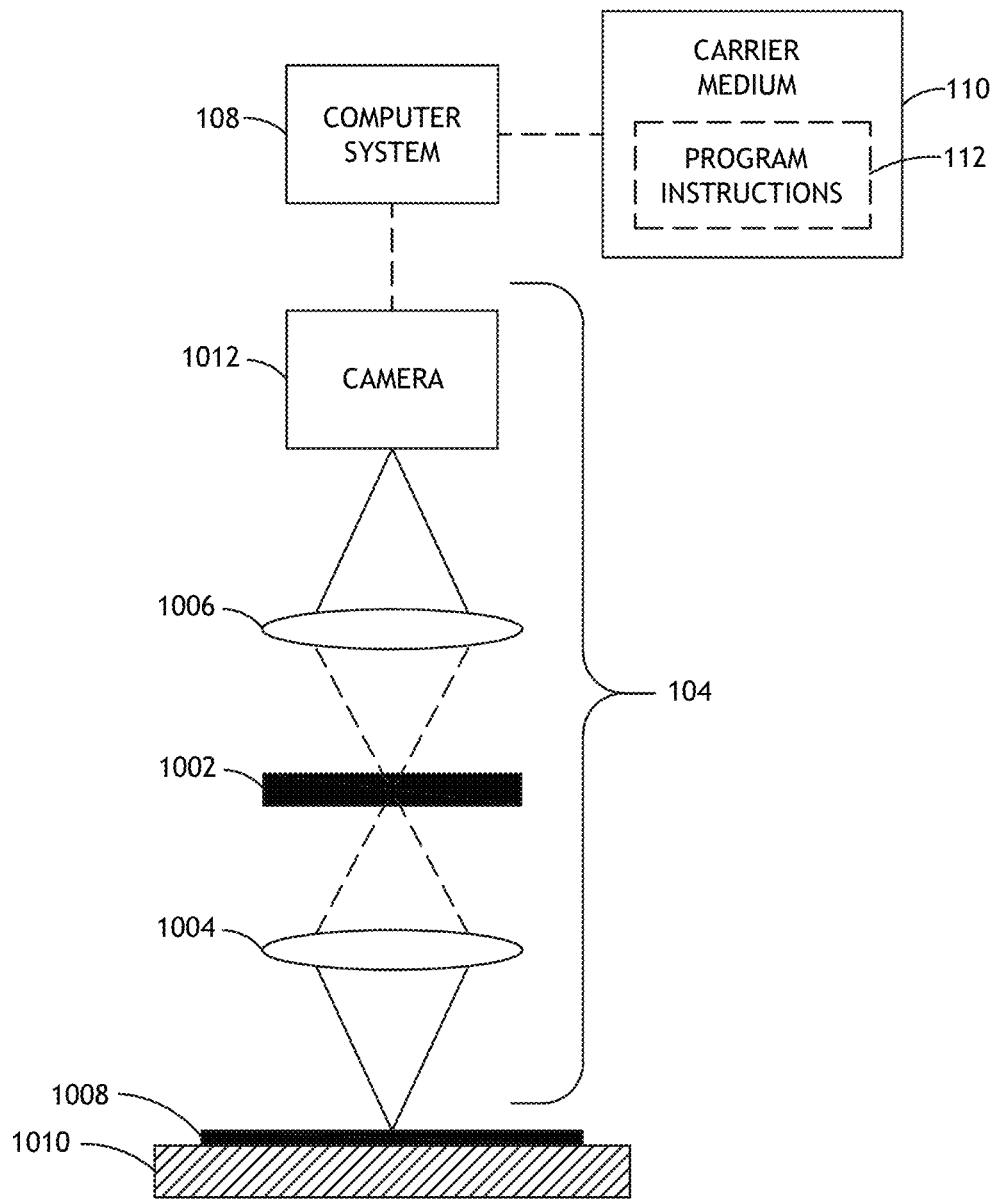
FIG. 10 is a block diagram illustrating a system for detecting defects in imagery data from a semiconductor surface including a hardware Fourier filter, in accordance with one embodiment of the present invention.

In an additional step of process 200, a hardware based filtering process may be implemented in conjunction with the VFF training process outlined above. In this manner, a hardware Fourier filter (HWFF) may be implemented within the inspection system 104 of the system 100. FIG. 10 illustrates a block diagram view of an inspection system 104 suitable for VFF filtering equipped with additional HWFF capabilities. It should be recognized by those skilled in the art that a variety of inspection system types may be suitable for implementation in the present invention, such as, but not limited to, a bright-field inspection system or a dark-field inspection system.

As shown in FIG. 10, the inspection system 104 includes, but is not limited to, a HWFF 1002, an objective lens 1004, an imaging lens 1006, and a camera 1012. In one aspect, the HWFF 1002 is positioned in an optical pupil plane of the optical column of the inspection system 104. For example, as shown in FIG. 10, the HWFF 1002 is positioned in the pupil plane defined by objective lens 1004 and imaging lens 1006. In this regard, the HWFF 1002 may act to filter out light reflected from one or more repeating patterns of the semiconductor wafer 1008 disposed on the stage 1010.

In one embodiment, the HWFF may filter out a portion of illumination reflecting from a portion of the semiconductor wafer corresponding to the one or more VFF working areas described in process 200. For example, the HWFF may filter out illumination reflecting from a repeating pattern portion of a selected working area which includes one or more of the VFF training blocks of process 200. It should be noted that in a general sense HWFF filtering is not by itself suitable for region-based filtering. As such, an implemented HWFF will act to filter out illumination from a large region of the semiconductor wafer 106 (e.g., an entire working area). Therefore, the HWFF 1002 may be used to implement Fourier filtering across a broad region of given semiconductor wafer 106, while a simultaneously implemented VFF may be used to implement region-based Fourier filtering.

In one embodiment, the HWFF 1002 of the system 1000 and the VFF generated by system 1000 may be configured to optimize overall pattern filtering performance. For example, the HWFF 1002 and the VFF may be configured to achieve an optimized VFF generation result. For instance, the VFF may be generated so as to optimize the pattern filtering of the system. In this manner, the selected filtered patterned regions and the selected peaks in the frequency domain spectra which are nulled by the generated VFF may be selected in order to maximize the performance of the combined HWFF 1002 and VFF system. For instance, a set of VFFs may be implemented in an array setting, so as to augment the filtering of light carried out by a HWFF.

In another embodiment, the HWFF of the system 1000 may be configured to optimize the performance of the generated VFF of the system 100. For example, the HWFF 1002 of the system 1000 may be selected in order to optimize the performance of a VFF generated by the system 1000.

In a further embodiment, the HWFF 1002 may be configured to filter light reflected from a first set of repeating patterns, while the generated VFF of process 200 may be simultaneously configured to filter light reflected from a different set of repeating patterns. In a further aspect, the generated VFF of process 200 may be utilized to target patterned regions of the semiconductor wafer with which the HWFF 1002 is not effective at filtering out. In this regard, the combination of HWFF and VFF filtering allows the system 100 and user to more efficiently tailor a pattern filtering protocol. As such, the HWFF and VFF may be selected such that their combination optimizes filtering illumination reflected from repeated patterns of the semiconductor wafer. In this sense, the system 100 or user may determine which frequency component is best suited for removal by either the HWFF or VFF.

In an additional step of process 200, one or more of the generated region-based VFFs of step 212 may be utilized in an inspection process executed by an inspection system in order to acquire a set of filtered imagery data from a portion of the semiconductor wafer. In one embodiment, upon training one or more VFFs using the VFF training blocks as described above, the generated VFF may be utilized to acquire inspection data filtered to exclude the repeating patterns of the VFF training block used to train the given VFF. In a further step of process 200, the filtered set of inspection data acquired using one or more region-based VFFs may be utilized in order to detect one or more defects present in the inspected area of the semiconductor wafer 106. In this manner, by removing the selected repeating pattern associated with a given patterned region, the imagery data collected by a camera (e.g., CCD) may more readily identify defects present on/in the surface of the semiconductor wafer.

Figure 11:
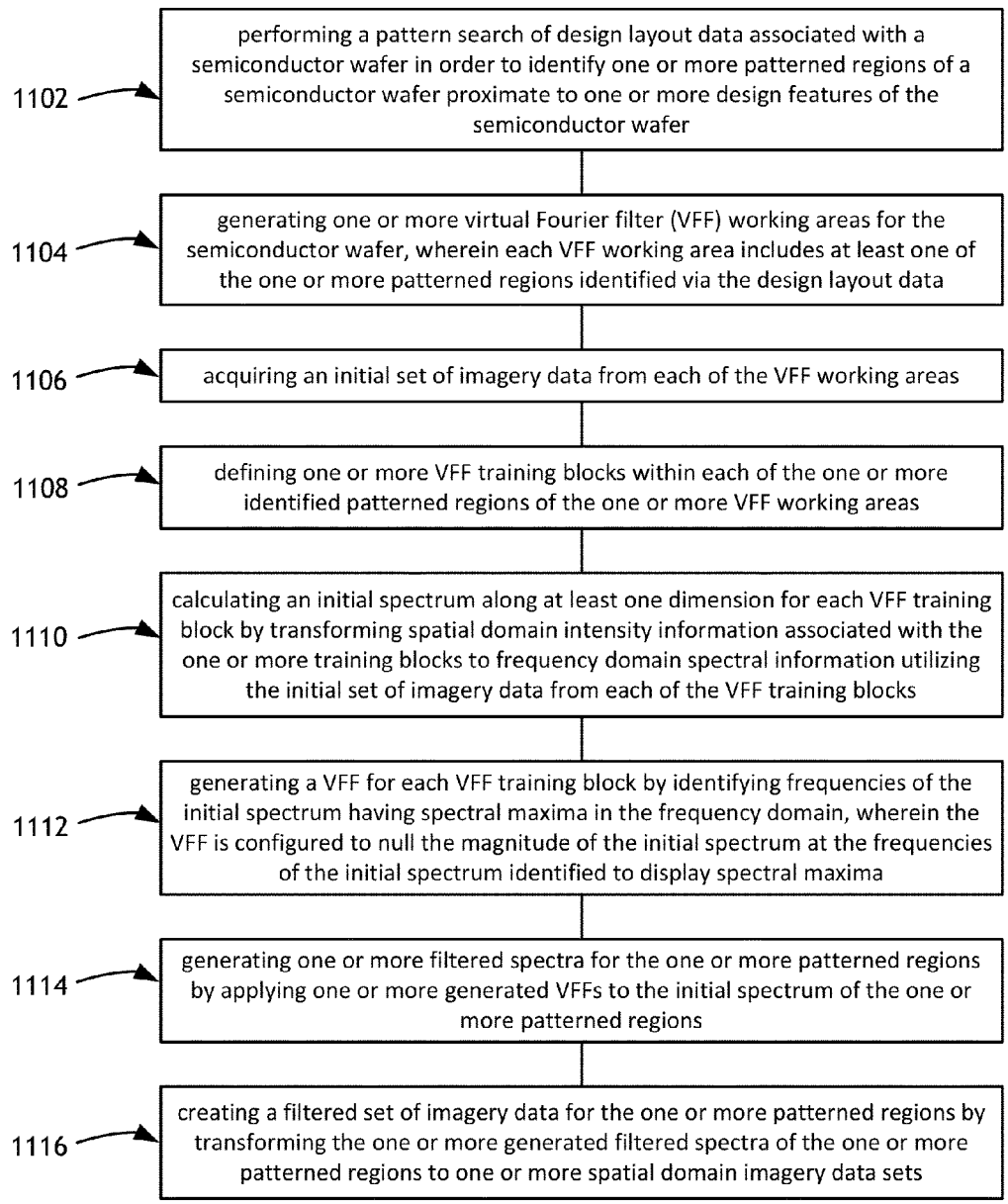
FIG. 11 is a flow diagram illustrating a method for detecting defects in imagery data from a semiconductor surface, in accordance with one embodiment of the present invention.

FIG. 11 is a flow diagram illustrating steps performed in an alternative process 1100 for detecting defects in imagery data of a semiconductor surface utilizing design data of the semiconductor surface. In a first step 1102, a pattern search may be performed on a set of design layout data associated with a semiconductor in order to identify a patterned region of the semiconductor wafer or a device structure of the semiconductor wafer. In one aspect, the patterned region identified via the design layout data is located proximate to one or more device structures of the semiconductor wafer. In another aspect, analysis of design layout data may be utilized to identify the device structures (e.g., SRAM block) of the semiconductor wafer. In this manner, a design layout data file, such as GDS or OASIS, may be scanned in order to areas of the design displaying repeating structures. For example, a design layout file may be scanned in order to identify areas of the design that share uniform periodicity.

It is recognized that the design layout data may contain multiple repeating structures, with each repeating structure displaying different pitches. This varying repeating pitch information may be utilized to define one or more different patterned regions. For example, the repeating pitch information may be utilized to distinguish between a SRAM device, a patterned region adjacent to an SRAM device, such as repeating patterns in the peripheral area or a random logic region of a semiconductor wafer.

Figure 12:
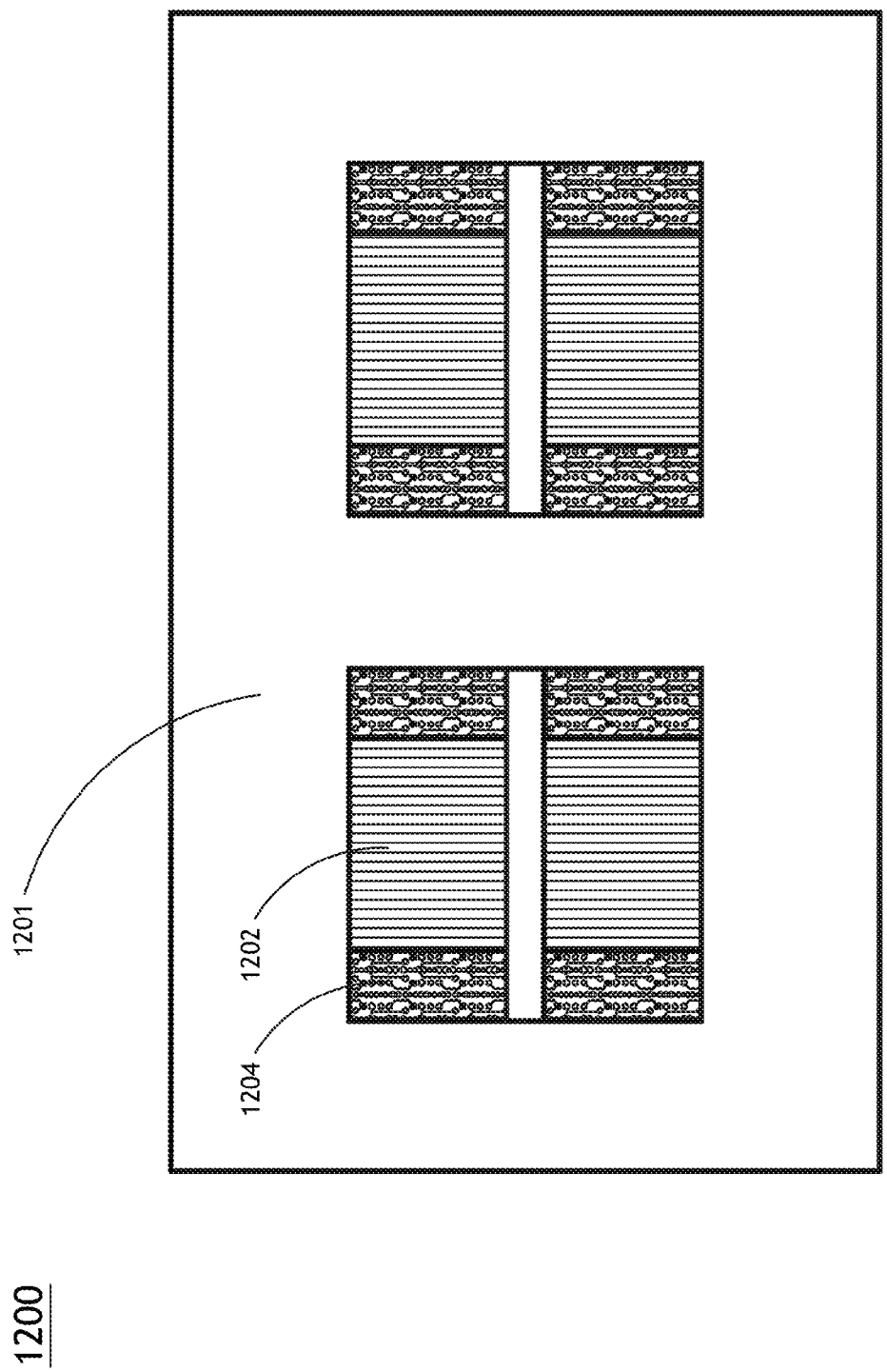
FIG. 12 is a schematic top plan view of a set of SRAM devices and their peripheral components of a semiconductor wafer, in accordance with one embodiment of the present invention.

Referring now to FIG. 12, in one embodiment, the one or more patterned regions may be identified via a pattern searching and grouping algorithm. In this manner, a pattern searching and grouping algorithm executed by a processor of the computer system 108 of the system 100 (see FIG. 1) may scan one or more design layout data files (e.g., GDS or OASIS) in order to search for and group like patterned areas into a single patterned region. In one sense, the pattern searching and grouping algorithm may be configured to identify two or more repeating pattern areas of a portion of the semiconductor wafer 1201 (as represented in the set of design layout data) which display the same or nearly the same repeating pitch (e.g., size or orientation). In another sense, the pattern searching and grouping algorithm may then group the identified two or more repeating pattern areas in a single patterned region. For example, the pattern searching and grouping algorithm executed by a processor of the computer system 108 may search the design layout data file(s) in order to identify two or more patterned areas of a semiconductor wafer 1201 having the same repeating pitch sizes and repeating pitch orientation. Then, the searching and grouping algorithm may group patterned areas having the same repeating pitch sizes and orientation into common groups. In this regard, the pattern searching and grouping algorithm may act to differentiate between an SRAM block 1202 and a repeating pattern structure (e.g., RPF) positioned proximate to an SRAM block 1204.

In another embodiment, the system 100 may act to group like pattern areas into patterned regions utilizing user supplied feedback via the user interface 116. Moreover, it is also contemplated that the system 100 may be configured to display identified patterned regions present in the design layout data to a user via a display 114 and the user may then provide feedback to the system 100 related to the accuracy of the automatic searching and grouping process carried out via the pattern searching and grouping algorithm. In this manner, the user may verify a pattern region, reject a pattern region, or adjust the location or size of a pattern region.

It is further recognized that the pattern regions of a semiconductor wafer corresponding to the pattern regions identified via the design data may be utilized to generate a VFF, similar to the process 200 discussed above. It is noted that the steps 1104 through 1116 of process 1100 are similar to the steps 204 through 216 of process 200. As such, the description of the various process steps of process 200 should be interpreted to extend to the process 1100.

Figure 13:
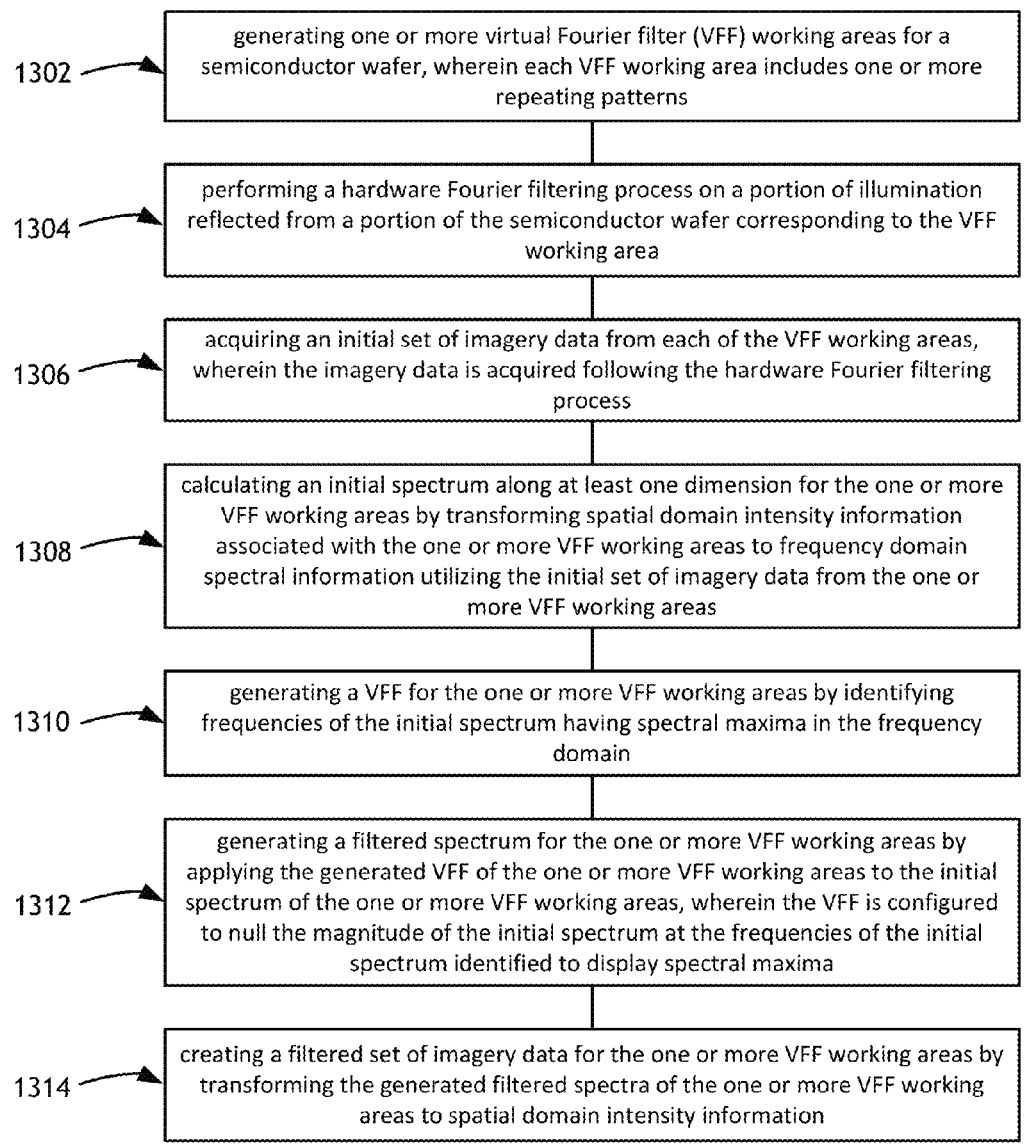
FIG. 13 is a flow diagram illustrating a method for detecting defects in imagery data from a semiconductor surface, in accordance with one embodiment of the present invention.

FIG. 13 is a flow diagram illustrating steps performed in an alternative process 1300 for detecting defects in imagery data of a semiconductor wafer. The process 1300 represents a non-region based approach to generating a VFF filter suitable for filtering out illumination reflected from repeating patterns of the semiconductor surface. Moreover, the process 1300 includes the additional aspect of augmenting the VFF filtering of illumination via hardware based Fourier filtering (HWFF). Referring again to FIG. 10, following a hardware Fourier filtering process, the system 1000 may be configured to generate a non-region based VFF utilizing spectra acquired from an entire defined working area.

In step 1302, one or more VFF working areas of a semiconductor wafer may be generated. In step 1304, a hardware based Fourier filtering process may be performed on a portion of light reflected from the semiconductor wafer defined by the VFF working area of step 1302. In step 1306, following the hardware Fourier filtering process, an initial set of imagery data from the VFF working areas may be acquired using an inspection system (e.g., bright field inspection system). In step 1308, an initial spectrum may be calculated for the VFF working areas by transforming the spatial domain intensity information of the acquired imagery data to frequency domain spectral information. In step 1310, a VFF may be generated for each of the VFF working areas by identifying the frequencies of the initial spectrum displaying spectral maxima in the frequency domain data. In step 1312, a filtered spectrum for each of the VFF working areas may be generated by applying the generated VFF of step 1310. In one aspect, the generated VFF is configured to null the magnitude of the initial spectrum at the frequencies of the initial spectrum identified to display spectral maxima. In step 1314, a filtered set of imager data for each of the working areas may be created by transforming the frequency domain filtered spectra created in step 1312 of the working areas to spatial domain intensity information. It is recognized herein that the particular aspects of the process steps 1302 through 1314 of process 1300 are generally described throughout the previously provided description of process 200 and process 1100. As such, the description related to process 200 and process 1100 should be interpreted to extend to process 1300.

In one embodiment, the HWFF 1002 may filter out a portion of illumination reflecting from a portion of the semiconductor wafer corresponding to the one or more VFF working areas described in process 200. For example, the HWFF may filter out illumination reflecting from a repeating pattern portion of a selected working area. Further, a non-region based VFF trained by the system 1000 may also be configured to filter out illumination reflecting from a repeating pattern portion of the same working area. As such, an implemented HWFF and non-region based VFF will act to filter out illumination from a large region of the semiconductor wafer 106 (e.g., an entire working area).

In another embodiment, the HWFF 1002 of the system 1000 and the VFF generated by system 1000 may be configured to optimize overall pattern filtering performance. For example, the HWFF 1002 and the VFF may be configured to achieve an optimized VFF generation result. For instance, the VFF may be generated so as to optimize the pattern filtering of the system. In this manner, the selected peaks in the frequency domain spectra which are nulled by the generated VFF may be selected in order to maximize the performance of the combined HWFF 1002 and VFF system. In another embodiment, the HWFF of the system 1000 may be configured to optimize the performance of the generated VFF of the system 100. For example, the HWFF 1002 of the system 1000 may be selected in order to optimize the performance of a VFF generated by the system 1000.

All of the images of the wafer generated using stored image data may also be stored in the arrays of the storage medium any other suitable storage media. For example, in one embodiment, the set of processor nodes may be configured to archive images of the wafer acquired in multiple imaging modes of the inspection system 104. In this manner, whole wafer images generated from image data acquired using multiple imaging modes may be stored on disk. In addition, the embodiments described herein may be configured to perform one or more functions using the archived wafer images. For example, in one embodiment, the archived images may be used for mode selection for an inspection recipe. Such archived images may be used as described further herein to select one or more parameters (e.g., an optical mode) of an inspection system 104 for inspection of wafers.

In addition, the set of processor nodes may be configured to perform archival of wafer images acquired using BF relatively small pixel inspection. For example, the inspection system 104 may be configured as a BF small pixel inspection system, and the set of processor nodes may be configured to archive images of wafers generated by the inspection system 104. A "small pixel" is defined herein as a pixel having a size that is less than about 100 nm. Such archived images may also be used to perform one or more applications described herein. For example, in one embodiment, the set of processor nodes is configured to perform offline image analysis of the image data stored in the arrays of the storage media to identify an inspection sample plan for another inspection system that has a lower throughput and higher resolution than the inspection system. Such offline image analysis may be performed using the archived BF relatively small pixel inspection images.

In one embodiment, the set of processor nodes is configured to tune an inspection recipe using the image data stored in the arrays of the storage media. For example, in one embodiment, the set of processor nodes is configured to select one or more defect detection parameters for inspection of the wafer using all of the image data or the selected portion of the image data generated by the detector during the scanning of the wafer that is stored in the arrays of the storage media. The one or more defect detection parameters may include any adjustable parameters of a defect detection method or algorithm (e.g., one or more thresholds). The one or more defect detection parameters may be selected using all of the image data or the selected portion of the image data according to any of the embodiments described herein.

In some embodiments, the set of processor nodes is configured to select one or more defect detection parameters for inspection of the wafer using the image data generated by the detector during the scanning of the wafer that is stored in the arrays of the storage media without requiring additional image data generated by performing additional scanning of the wafer. In this manner, the embodiments described herein enable algorithm tuning using stored data playback thereby freeing up valuable inspection system time that would otherwise be required to rescan the target wafers. In particular, the VI stores wafer images to disk for later playback without the need of a tool or the wafer. The wafer images can be scanned as if the wafer was loaded on the tool thereby allowing users to optimize recipes for a specific optics mode/light level. For example, the inspection system 104 may only be necessary during the initial image acquisition.

Using the stored image data for offline recipe setup, "new" defects can be detected by running new inspections without the physical wafer being needed. As such, offline recipe setup may include detecting new defects without the presence of a wafer and an inspection system 202. In this manner, the selection of one or more defect detection parameters can be performed without requiring additional scanning of the wafer and without being limited to those defects that were detected during inspection of the wafer. In particular, since the raw image data is stored, multiple defect detection algorithms can be applied to the raw image data during offline setup, and the multiple defect detection algorithms can be increased in sensitivity such that defects can not only be eliminated by adjusting the one or more defect detection parameters but can also be discovered by adjusting the one or more defect detection parameters.

In one embodiment, defects may be detected on the wafer using the inspection data and a standard reference die for standard reference die based inspection. For example, defect detection may include performing standard reference die based inspection. In some such embodiments, defect detection may include applying mapping of a standard reference die image in design data space to live images acquired by the inspection system for the wafer for standard reference die-to-die inspection mode. The term "standard reference die" generally refers to a reference die on the wafer that is being inspected but does not meet the normal adjacency constraints to the "test" die that are required for die-to-die inspection. Some commercially available inspection systems are configured to use some version of the standard reference die-to-die inspection mode.

One implementation of the standard reference die-to-die inspection mode involves comparing a die to any die within a die row. In another implementation, the standard reference die image may be a stored image. Therefore, stored standard reference die-to-die inspection mode is much like standard reference die-to-die inspection mode, except that the constraint of using a reference die on the wafer is eliminated. One advantage of this inspection mode is that the stored standard reference die image can be modified to make the standard reference die image "substantially defect free."

In one embodiment, which may be used for standard reference die-to-die inspection mode, the live image acquired for a die being inspected is aligned to and compared with a stored die image obtained from a known good die (standard reference die) on another wafer. In this case, mapping of the standard reference die pixels to design data coordinate space may be performed completely online. For instance, the alignment sites in the standard reference die may be mapped in the design data space as described above, and the mapped standard reference die pixels may be stored online and fed into the inspection system during inspection. In this manner, for the standard reference die-to-die inspection mode, determining the position of the live inspection data in design data coordinate space may be performed by aligning the live data to the stored standard reference die image or data which itself has been mapped to design space.

In another embodiment, for standard reference die-to-die inspection, a known good die on a reference wafer is scanned at the selected pixel size and imaging mode and the entire known good die image may be stored in an appropriate storage medium (e.g., a disk). During inspection of a wafer, a swath of the appropriate standard reference die image is downloaded into the inspection system image computer, and as each die is scanned, frames of the target die (i.e., the die being inspected) are aligned with the corresponding standard reference die frames. Misalignment between the frames may be corrected using sub-pixel interpolation. The standard reference die image may then the compared to an image of the wafer to detect defects on the wafer (e.g., to detect defective pixel). In this manner, the same image can be used for aligning inspection data to design data space coordinates and for defect detection.

In a different embodiment, the method includes aligning data for the alignment sites on the wafer in the inspection data stream to rendered GDS clips for the predetermined alignment sites to correct errors in real-time. For example, the method may include applying mapping of the rendered GDS II clips in design data space to the data for the alignment sites on the wafer for die-to-die inspection mode. The method may include correlating downloaded alignment site patch images (selected during setup of the inspection process) with the live image data over a predetermined search range and determining the offset between the two images. In another example, aligning data for the alignment sites on the wafer in the inspection data stream to data for the predetermined alignment sites may be performed by aligning a centroid or other attribute of one or more features in the alignment sites, which may be performed as described further herein. In one embodiment, for defect detection in die-to-die inspection mode, data for each scanned die frame is aligned with data for the subsequent die frame in the swath. In this case, mapping of the predetermined alignment sites and the alignment sites on the wafer may not be performed offline since the position of the data for each die in the inspection data stream is subject to mechanical and other error sources of the inspection system. Therefore, in this case, the method may include identifying the alignment sites in each die (e.g., using the image computer) during the acquisition of the inspection data.

In some embodiments, defect information may be aligned with electrical design. For example, a scanning electron microscope (SEM) review system may be used to determine more accurate coordinates of defect locations for a sample of defects, and the defect coordinates reported by the SEM review system may be used to determine locations of defects in the electrical design. In other embodiments, inspection care areas (e.g., the areas of the device pattern formed on the wafer in which inspection will be performed) may be aligned to the physical location of the pattern printed on the wafer.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A computer implemented method for detecting defects in imagery data acquired from a semiconductor surface, comprising:
    performing a pattern search of one or more sets of imagery data in order to identify one or more patterned regions on a semiconductor wafer;
    generating one or more virtual Fourier filter (VFF) working areas, wherein each VFF working area includes at least one of the one or more identified patterned regions;
    acquiring an initial set of imagery data from each of the VFF working areas;
    defining two or more VFF training blocks within each of the one or more VFF working areas utilizing the initial set of imagery data so as to limit an intensity contribution from non-repeating pattern portions of the identified patterned region, wherein a first VFF training block within a selected working area is defined to encompass a first portion of the selected working area including a first identified patterned region of the one or more identified pattern regions including a selected repeating pattern, wherein an additional VFF training block within the selected working area is defined to encompass an additional portion of the selected working area including an additional identified patterned region of the one or more identified pattern regions including the selected repeating pattern;
    calculating an initial spectrum along at least one dimension for each VFF training block by transforming spatial domain intensity information associated with the two or more VFF training blocks to frequency domain spectral information utilizing the initial set of imagery data from each of the VFF training blocks;
    generating a VFF for each VFF training block by identifying frequencies of the initial spectrum having spectral maxima in the frequency domain, wherein the VFF is configured to null the magnitude of the initial spectrum at the frequencies of the initial spectrum identified to display spectral maxima;
    generating one or more filtered spectra for the one or more patterned regions by applying one or more generated VFFs to the initial spectrum of the one or more patterned regions; and
    creating a filtered set of imagery data for the one or more patterned regions by transforming the one or more generated filtered spectra of the one or more patterned regions to one or more spatial domain imagery data sets.

2. The method of claim 1, further comprising:
    utilizing one or more of the generated VFFs during an inspection process of a portion of the semiconductor wafer in order to acquire a filtered set of imagery data of the portion of the semiconductor wafer.

3. The method of claim 2, further comprising:
    utilizing the filtered set of imagery data of the portion of the semiconductor wafer in order to detect one or more defects of the semiconductor wafer.

4. The method of claim 1, further comprising:
    combining a first VFF of a first training block of a patterned region with at least a second VFF from at least a second training block of the patterned region into an aggregated VFF.

5. The method of claim 1, further comprising:
    verifying the filtered set of imagery data by comparing the filtered set of imagery data to the initial set of imagery data.

6. The method of claim 1, wherein further comprising:
    verifying a filtered spectrum for each training block by comparing the filtered spectrum for each training block to the initial calculated spectrum for each training block.

7. The method of claim 1, wherein the frequencies of the initial spectrum having spectral maxima in the frequency domain are identified via a peak finding algorithm.

8. The method of claim 1, wherein the frequencies of the initial spectrum having spectral maxima in the frequency domain are identifiable utilizing user feedback provided via a user interface.

9. The method of claim 1, wherein the two or more VFF training blocks are identified via a training block algorithm.

10. The method of claim 1, wherein the two or more VFF training blocks are identifiable utilizing user feedback via a user interface.

11. The method of claim 1, wherein the initial set of imagery data from each of the VFF working areas comprises:
    a set of images from a die, wherein each image of the set of images covers a portion of the die.

12. The method of claim 1, wherein the one or more patterned regions on a semiconductor wafer are identified via a pattern searching and grouping algorithm.

13. The method of claim 12, wherein the pattern searching and grouping algorithm is configured to:
    identify a plurality of repeating pattern areas across a portion of the semiconductor wafer having the same repeating pitch; and
    merge the plurality of repeating pattern areas having the same repeating pitch into a patterned region.

14. The method of claim 1, wherein the initial set of imagery data includes a first portion of imagery data and at least a second set of imagery data, wherein the first portion of imagery data is collected on a first channel and the at least a second set of imagery data is collected on at least a second channel different than the first channel.

15. The method of claim 1, wherein the one or more generated VFFs comprise at least one of a one-dimensional VFF or a two-dimensional VFF.

16. The method of claim 1, further comprising:
    performing a hardware Fourier filtering process utilizing a hardware Fourier filter (HWFF) on a portion of illumination reflected from a portion of the semiconductor wafer corresponding to the one or more VFF working areas.

17. The method of claim 16, wherein the HWFF is configured to filter light reflected from a first set of repeating patterns and the generated VFF are configured to filter light reflected from at least a second set of repeating patterns, the at least a second set of repeating patterns different from the first set of repeating patterns.

18. The method of claim 16, wherein at least one generated VFF is configured to filter light reflected from a first pattern region, wherein the HWFF is not suitable for filtering light reflected from the first pattern region.

19. The method of claim 16, wherein the HWFF is configured to enhance performance of the generated VFF.

20. The method of claim 16, wherein the HWFF and the generated VFF are configured to enhance overall repeating pattern filtering.

21. A computer implemented method for detecting defects utilizing design data associated with a semiconductor surface, comprising:
performing a pattern search of design layout data associated with a semiconductor wafer in order to identify at least one of one or more patterned regions of a semiconductor wafer proximate to one or more device structures of the semiconductor wafer or the one or more device structures;
generating one or more virtual Fourier filter (VFF) working areas for the semiconductor wafer, wherein each VFF working area includes at least one of the one or more patterned regions identified via the design layout data;
acquiring an initial set of imagery data from each of the VFF working areas;
defining two or more VFF training blocks within each of the one or more VFF working areas utilizing the initial set of imagery data so as to limit an intensity contribution from non-repeating pattern portions of the identified patterned region, wherein a first VFF training block within a selected working area is defined to encompass a first portion of the selected working area including a first identified patterned region of the one or more identified pattern regions including a selected repeating pattern, wherein an additional VFF training block within the selected working area is defined to encompass an additional portion of the selected working area including an additional identified patterned region of the one or more identified pattern regions including the selected repeating pattern;
calculating an initial spectrum along at least one dimension for each VFF training block by transforming spatial domain intensity information associated with the two or more training blocks to frequency domain spectral information utilizing the initial set of imagery data from each of the VFF training blocks;
generating a VFF for each VFF training block by identifying frequencies of the initial spectrum having spectral maxima in the frequency domain;
generating one or more filtered spectra for the one or more patterned regions by applying one or more generated VFFs to the initial spectrum of the one or more patterned regions; and
creating a filtered set of imagery data for the one or more patterned regions by transforming the one or more generated filtered spectra of the one or more patterned regions to one or more spatial domain imagery data sets.

22. The method of claim 21, wherein the design layout data comprises one of GDS data or OASIS data.

23. The method of claim 21, wherein the one of one or more device structures comprises:
a SRAM block.

24. The method of claim 21, wherein the one or more patterned regions of a semiconductor wafer proximate to one or more device structures comprises:
a repeating structure positioned proximate to one or more SRAM blocks.

25. The method of claim 21, wherein identifying one or more patterned regions comprises:
identifying one or more patterned regions utilizing a pattern searching and grouping algorithm.

26. The method of claim 25, wherein the pattern searching and grouping algorithm is configured to:
identify a plurality of patterned areas of a semiconductor wafer having substantially similar repeating pitch sizes and repeating pitch orientation; and
group the identified plurality of patterned areas of the semiconductor wafer into a common patterned region.

27. The method of claim 25, wherein the pattern search algorithm is configured to distinguish between at least one SRAM region, at least one patterned region proximate to the SRAM region, and at least one random logic region.

28. A system for detecting defects in imagery data acquired from a semiconductor surface, comprising:
an inspection system; and
a computing system communicatively coupled to the inspection system, the computing system including one or more processors configured to execute a set of program instructions maintained on a memory medium, the set of program instructions configured to cause the one or processors to:
receive, from the inspection system, one or more sets of imagery data from a semiconductor wafer;
perform a pattern search of the one or more sets of imagery data in order to identify one or more patterned regions on the semiconductor wafer;
generate one or more virtual Fourier filter (VFF) working areas, wherein each VFF working area includes at least one of the one or more identified patterned regions;
define two or more VFF training blocks within each of the one or more VFF working areas utilizing the one or more sets of imagery data so as to limit an intensity contribution from non-repeating pattern portions of the one or more identified patterned regions, wherein a first VFF training block within a selected working area is defined to encompass a first portion of the selected working area including a first identified patterned region of the one or more identified pattern regions including a selected repeating pattern, wherein an additional VFF training block within the selected working area is defined to encompass an additional portion of the selected working area including an additional identified patterned region of the one or more identified pattern regions including the selected repeating pattern;
calculate an initial spectrum along at least one dimension for each VFF training block by transforming spatial domain intensity information associated with the two or more VFF training blocks to frequency domain spectral information utilizing the imagery data from each of the VFF training blocks;
generate a VFF for each VFF training block by identifying frequencies of the initial spectrum having spectral maxima in the frequency domain, wherein the VFF is configured to null the magnitude of the initial spectrum at the frequencies of the initial spectrum identified to display spectral maxima;
generate one or more filtered spectra for the one or more patterned regions by applying one or more generated VFFs to the initial spectrum of the one or more patterned regions; and
creating a filtered set of imagery data for the one or more patterned regions by transforming the one or more generated filtered spectra of the one or more patterned regions to one or more spatial domain imagery data sets.

29. The system of claim 28, wherein the inspection system comprises:
at least one of a brightfield inspection system or a darkfield inspection system.

30. The system of claim 28, wherein the inspection system comprises:
an electron beam inspection system.

31. The system of claim 28, wherein the inspection system includes a hardware Fourier filter (HWFF).

32. A system for detecting defects in imagery data acquired from a semiconductor surface, comprising:
an inspection system; and
a computing system communicatively coupled to the inspection system, the computing system including one or more processors configured to execute a set of program instructions maintained on a memory medium, the set of program instructions configured to cause the one or processors to:
perform a pattern search of design layout data associated with a semiconductor wafer in order to identify at least one of one or more patterned regions of a semiconductor wafer proximate to one or more device structures of the semiconductor wafer or the one or more device structures;
generate one or more virtual Fourier filter (VFF) working areas for the semiconductor wafer, wherein each VFF working area includes at least one of the one or more patterned regions identified via the design layout data;
receive, from the inspection system, an initial set of imagery data from each of the VFF working areas;
define two or more VFF training blocks within each of the one or more VFF working areas utilizing the initial set of imagery data so as to limit an intensity contribution from non-repeating pattern portions of the identified patterned region, wherein a first VFF training block within a selected working area is defined to encompass a first portion of the selected working area including a first identified patterned region of the one or more identified pattern regions including a selected repeating pattern, wherein an additional VFF training block within the selected working area is defined to encompass an additional portion of the selected working area including an additional identified patterned region of the one or more identified pattern regions including the selected repeating pattern;
calculate an initial spectrum along at least one dimension for each VFF training block by transforming spatial domain intensity information associated with the two or more training blocks to frequency domain spectral information utilizing the initial set of imagery data from each of the VFF training blocks;
generate a VFF for each VFF training block by identifying frequencies of the initial spectrum having spectral maxima in the frequency domain;
generate one or more filtered spectra for the one or more patterned regions by applying one or more generated VFFs to the initial spectrum of the one or more patterned regions; and
create a filtered set of imagery data for the one or more patterned regions by transforming the one or more generated filtered spectra of the one or more patterned regions to one or more spatial domain imagery data sets.

33. The system of claim 32, wherein the inspection system comprises:
at least one of a brightfield inspection system or a darkfield inspection system.

34. The system of claim 32, wherein the inspection system comprises:
an electron beam inspection system.

35. The system of claim 32, wherein the inspection system includes a hardware Fourier filter (HWFF).

* * * * *